(12) United States Patent
Suzuki et al.

(10) Patent No.: US 7,131,729 B2
(45) Date of Patent: Nov. 7, 2006

(54) PROJECTION DISPLAY APPARATUS

(75) Inventors: Tetsuji Suzuki, Yokosuka (JP); Keiichi Maeno, Tokyo (JP); Satoru Moriya, Noda (JP)

(73) Assignee: Victor Company of Japan Ltd., Yokohama (JP)

( * ) Notice: Subject to any disclaimer, the term of this patent is extended or adjusted under 35 U.S.C. 154(b) by 193 days.

(21) Appl. No.: 10/809,542

(22) Filed: Mar. 26, 2004

(65) Prior Publication Data

US 2004/0189950 A1   Sep. 30, 2004

(30) Foreign Application Priority Data

Mar. 31, 2003  (JP) .......................... P2003-094041
Apr. 1, 2003   (JP) .......................... P2003-097747
Apr. 1, 2003   (JP) .......................... P2003-097748

(51) Int. Cl.
*G03B 21/14* (2006.01)
*G03B 21/26* (2006.01)
*G03B 21/28* (2006.01)
*G02F 1/1335* (2006.01)
*G02F 1/00* (2006.01)
*H04N 5/74* (2006.01)
*G02B 5/30* (2006.01)

(52) U.S. Cl. ........................... 353/20; 353/31; 353/33; 353/34; 353/37; 353/81; 353/82; 349/9; 349/96; 248/750; 248/757; 248/758; 359/495; 359/629

(58) Field of Classification Search ................. 353/20, 353/30, 31, 33, 34, 37, 81, 84, 98, 99, 102; 349/7–9, 96, 104, 106, 113; 359/618, 629, 359/634, 638, 483, 487, 495; 348/739, 744, 348/750, 751, 752, 757, 758
See application file for complete search history.

(56) References Cited

U.S. PATENT DOCUMENTS

| 6,234,634 | B1 | 5/2001 | Hansen et al. ................. 353/20 |
| 6,873,469 | B1 * | 3/2005 | De Vaan et al. ............. 359/629 |
| 2002/0154420 | A1 * | 10/2002 | Magarill et al. ............. 359/831 |
| 2002/0180932 | A1 * | 12/2002 | Shimizu et al. ............... 353/20 |

FOREIGN PATENT DOCUMENTS

| JP | 2001-174755 | 6/2001 |
| JP | 2002-372749 | 12/2002 |

* cited by examiner

*Primary Examiner*—W. B. Perkey
*Assistant Examiner*—Rochelle Blackman
(74) *Attorney, Agent, or Firm*—Nath & Associates PLLC; Gregory B. Kang; Jerald L. Meyer

(57) ABSTRACT

A projection display apparatus that is lightweight and provides bright, high quality images is provided. The projection display apparatus comprising a color separation and synthesis optical system 4, that performs color synthesis, generating an image, after separating light of the three primary colors of determined polarities into the respective three colors, and modulating those three color lights in relation to respective image signals therefor, and a projection lens 106. The color separation and synthesis optical system 4 comprises polarized light separating means 8, 9, 11 and 16 disposed in respective diagonal directions therein and reflecting spatial light modulating elements 12, 13 and 14 disposed to perform light modulation coordinated to an image signal for each respective color, for light separated according to polarization by the four polarized light separating means 8, 9, 11. Three spatial light modulating elements 12, 13 and 14 are disposed on the outer side of the polarized light separating means 9, 11 and 16, other than the polarized light separating means 8, that is disposed on that side of incident light, at least two from among the four polarized light separating means 8, 9, 11 and 16 are wire grid polarized light separating plates and an astigmatism correcting lens 21 is provided between the polarized light separating means 16 disposed on that side at which projection is performed and at least one of the spatial light modulating elements.

3 Claims, 16 Drawing Sheets

PROJECTION DISPLAY APPARATUS

FIELD OF THE INVENTION

The present invention relates to a projection display apparatus using reflective type spatial light modulating elements.

BACKGROUND OF THE INVENTION

Color projection display apparatuses breakdown each of the three primary color red, green and blue light components from white light and lead those components to the respective corresponding spatial light modulating elements, where the color lights modulated in coordination to an image signal are synthesized and projected, causing color images to be displayed on screen.

Systems using reflective type spatial light modulating elements for a projection display apparatus are beneficial for producing high resolution, however there is a tendency for such apparatuses to have complex optical structures. A projection image display apparatus is disclosed in Japanese Patent Application Laid-Open Publication No. 2001-174755, pp. 8–9, FIG. 8.

Japanese Patent Application Laid-Open Publication No. 2001-174755 discloses a structure comprising a lens for focusing light of the three primary colors, already made into p-polarized light as light of indeterminate polarity passes a polarizing panel or the like, a dichroic mirror, inclined at a 45° angle to the optical axis, that reflects green p-polarized light from this white light source and passes other p-polarized lights, a primary polarized light beam splitter prism that passes green p-polarized light reflected at the dichroic mirror and reflects s-polarized green light, a wavelength selective phase plate for red light, that rotates the plane of polarization of red light among the other p-polarized lights passing the dichroic mirror 90° and passes p-polarized blue light, and a secondary polarized light beam splitter prism that reflects red light, made into s-polarized light at the wavelength selective phase plate for red light and passes p-polarized blue light.

Further, the system comprises, spatial light modulating elements for green light, operating on the side of the primary polarized light beam splitter prism of passed green light, that modulate p-polarized green light in relation to an image signal, forming that light into s-polarized light and reflecting it, spatial light modulating elements for red light, operating on the side of p-polarized red light reflected at the secondary polarized light beam splitter prism, that modulate s-polarized red light in relation to an image signal, forming that light into p-polarized light and reflecting it, spatial light modulating elements for blue light, operating on the side of the secondary polarized light beam splitter prism of passed p-polarized blue light, that modulate p-polarized blue light in relation to an image signal, forming that light into s-polarized light and reflecting it, and a wavelength selective phase plate for blue light, that rotates 90° the plane of polarization of blue light from among p-polarized red light passing the secondary polarized light beam splitter prism and s-polarized blue light reflected at the secondary polarized light beam splitter prism, making that blue light into p-polarized light and passing p-polarized red light.

Moreover, that system comprises a tertiary polarized light beam splitter prism that reflects s-polarized green light reflected at the primary polarized light beam splitter prism and passes p-polarized blue and red lights passing the wavelength selective phase plate for blue light, and a projection lens for projecting p-polarized red, green and blue lights emitted from the tertiary polarized light beam splitter prism.

Further, that system comprises a λ/4 phase plate disposed between the primary polarized light beam splitter prism and the spatial light modulating elements for green light, that forms p-polarized green light emitted from the primary polarized light beam splitter prism into linearly polarized light and linearly polarized light from the spatial light modulating elements for green light into elliptically polarized light without green light reflected at the spatial light modulating elements for green light being slantingly injected into the primary polarized light beam splitter prism and suffering polarity degradation.

A secondary λ/4 phase plate the same as the above-mentioned plate is disposed between the secondary polarized light beam splitter prism and the spatial light modulating elements for red light, and a tertiary λ/4 phase plate the same as the above-mentioned two plates is disposed between the secondary polarized light beam splitter prism and the spatial light modulating elements for blue light.

The optical structure resulting from this projection display apparatus is simple and it is difficult for light beams to become mixed, thereby enabling a projection image having high contrast to be obtained at low cost.

The polarized light separating surfaces used in the primary, secondary and tertiary polarized light beam splitter prisms are formed of an optical membrane of tens of dielectric membranes deposited on the inclined face part of a right angle prism, as shown in FIG. 1A and FIG. 1B, the angle of incidence being a parameter for the rate of permeability for this optical membrane.

FIG. 1A shows wavelength dependence of the rate of permeability p-polarized light in visible wavelength regions when the angle of incidence β of incident light L1 to the transmittance face of a polarized light beam splitter prism 30 is a parameter as shown in FIG. 1B.

FIG. 1A shows the cases for the angle of incidence β of light incident L1 to the transmittance face of the polarized light beam splitter prism 30 where 'a' is 0°, 'b' is 6°, 'c' is 15°, 'd' is +6° and 'e' is +15°.

The angle of incidence β is the angle where incident light L1 to the polarized beam splitter prism provides the optical axis 30.

As shown in FIG. 1A and FIG. 1B, when the angle of incidence β of light incident L1 to the transmittance surface of a polarized light beam splitter prism 30 is within ±6° wavelength dependence of the rate of permeability of p-polarized light is relatively uniform, however when this angle of incidence is exceeded there is substantial wavelength dependence and the rate of permeability deteriorates.

Normally, because main light source input parallel with the optical axis or light incident at angles other than the angles prescribed input to a polarized light separating surface are included in light of indeterminate polarity, even if a main light beam is input to the polarized light separating surface parallel with the optical axis, light other than that main light cannot be input parallel with the optical axis. Thus, as described above, when light of indeterminate polarity is input to the polarized light separating surfaces color reproducibility deteriorates because permeability at those polarized light separating surfaces differs according to wavelength.

As a solution to this, it is possible to consider making the angle of incidence of light of indeterminate polarity input to the polarized light separating surfaces narrower, reducing the wavelength dependence of the rate of permeability, however this causes light of indeterminate polarity other than such light to become external light which is not used by the projection display apparatus, resulting in deteriorating brightness.

Further, heat distribution arises as light of the three primary colors is absorbed by the primary, secondary and tertiary polarized light beam splitter prisms, the refractive index changing due to differences of temperatures in the primary, secondary and tertiary polarized light beam splitter prisms and double refraction occurs leading to deteriorating image quality. This is because light polarizing surfaces within the prisms forming a polarized light beam splitter prism partially rotate. In order to prevent these problems from occurring it is necessary to use material having a low photo elasticity factor to suppress the double refraction of glass material used, however this is more costly.

Moreover, as it is becoming desirable for projection display apparatuses to be increasingly miniaturized, these polarized light beam splitter prisms, being the heaviest component within the apparatus, must be made lighter. Again, as the size of display elements increases the size of these prisms increases also, making these prisms increasingly weighty.

With the foregoing in view it is an object of the present invention to provide a lightweight projection display apparatus producing high-quality images.

SUMMERY OF THE INVENTION

According to a first aspect of the present invention, a projection image apparatus includes a color separating and synthesis optical system comprising a first polarized light separating means, a second polarized light separating means, a third polarized light separating means and a fourth polarized light separating means wherein said first, second, third and fourth light separating means are disposed in respective diagonal directions therein, said first polarized light separating means is disposed on that side on which illuminating light is incident and said fourth polarized light separating means is disposed on that side at which projection is performed, a first reflective type spatial light modulating elements disposed on either the opposite side with respect to that side of said second polarized light separating means on which said first polarized light separating means is disposed or the opposite side with respect to that side on which said fourth polarized light separating means is disposed, a second reflective type spatial light modulating elements disposed on the opposite side with respect to that side of said third polarized light separating means on which said first polarized light separating means is disposed, and a third reflective type spatial light modulating elements disposed on the opposite side with respect to that side of said third polarized light separating means on which said fourth polarized light separating means is disposed, in which color separating and synthesis optical system, after light including light of the three primary colors made in advance into light of determined polarization from light of indeterminate polarization is separated into the respective primary colors by said first, second and third polarized light separating means, and after each respective color undergoes modulation coordinated to an image signal for each respective color and is reflected by the respective said first, second and third reflective type spatial light modulating elements, color synthesis is performed and a color image is generated by said second, third and fourth polarized light separating means; and a projection lens for expansively projecting said color image generated by said color separating and synthesis optical system; wherein at least two from among said first, second, third and fourth polarized light separating means are wire grid polarized light separating plates and a lens for correcting astigmatism is disposed near the side of the reflective surface of at least one from among said first, second and third reflective type spatial light modulating elements.

Desirably, said projection display apparatus is provided wherein said astigmatism correcting lens is a cylindrical lens.

Desirably, said projection display apparatus is provided wherein the surface of said cylindrical lens is an aspheric, toroidal surface.

According to yet another aspect of the present invention, a projection display apparatus includes a color separating and synthesis optical system comprising a first light separating means, a second light separating means, a third light separating means and a fourth light separating means wherein said first, second, third and fourth light separating means are disposed in respective diagonal directions therein, said first light separating means is disposed on that side on which illuminating light is incident and said fourth light separating means is disposed on that side at which projection is performed, a first reflective type spatial light modulating elements disposed on either the opposite side with respect to that side of said second light separating means on which said first light separating means is disposed or the opposite side with respect to that side on which said fourth light separating means is disposed, a second reflective type spatial light modulating elements disposed on the opposite side with respect to that side of said third light separating means on which said first light separating means is disposed, and a third reflective type spatial light modulating elements disposed on the opposite side with respect to that side of said third light separating means on which said fourth light separating means is disposed, in which color separating and synthesis optical system, after light including light of the three primary colors is separated into the respective primary colors by said first, second and third light separating means, and after each respective color undergoes modulation coordinated to an image signal for each respective color and is reflected by the respective said first, second and third reflective type spatial light modulating elements, color synthesis is performed and a color image is generated by said second, third and fourth light separating means; and a projection lens for expansively projecting said color image generated by said color separating and synthesis optical system; wherein said first light separating means is a first dichroic separating means, said fourth light separating means is a second dichroic separating means or a polarized light beam splitter means, said other light separating means are wire grid polarized light separating plates, and a lens for correcting astigmatism is disposed near the side of the reflective surface of at least one from among said first, second and third reflective type spatial light modulating elements.

Desirably, said projection display apparatus is provided wherein said astigmatism correcting lens is a cylindrical lens.

Desirably, said projection display apparatus is provided wherein the surface of said cylindrical lens is an aspheric, toroidal surface.

According to yet another aspect of the present invention, a projection display apparatus includes a color separating and synthesis optical system comprising a first light separating means, a second light separating means, a third light separating means and a fourth light separating means wherein said first, second, third and fourth light separating means are disposed in respective diagonal directions therein, said first light separating means is disposed on that side on which illuminating light is incident and said fourth light separating means is disposed on that side at which projection is performed, a first reflective type spatial light modulating elements disposed on either the opposite side with respect to that side of said second light separating means on which said first light separating means is disposed or the opposite side with respect to that side on which said fourth light separating means is disposed, a second reflective type spatial light modulating elements disposed on the opposite side with respect to that side of said third light separating means on which said first light separating means is disposed, and a third reflective type spatial light modulating elements disposed on the opposite side with respect to that side of said third light separating means on which said fourth light separating means is disposed, in which color separating and synthesis optical system, after light including light of the three primary colors is separated into the respective primary colors by said first, second and third light separating means, and after each respective color undergoes modulation coordinated to an image signal for each respective color and is reflected by the respective said first, second and third reflective type spatial light modulating elements, color synthesis is performed and a color image is generated by said second, third and fourth light separating means; and a projection lens for expansively projecting said color image generated by said color separating and synthesis optical system; wherein said second and third light separating means are wire grid polarized light separating plates, a first polarized light separating plate is disposed on that side of said fourth light separating means having said second light separating means and a second polarized light separating plate is disposed on that side of said fourth light separating means having said third light separating means.

Desirably, a lens for correcting astigmatism is disposed near the side of the reflective surface of at least one from among said first, second and third reflective type spatial light modulating elements.

Desirably, said projection display apparatus is provided wherein said astigmatism correcting lens is a cylindrical lens.

Desirably, said projection display apparatus is provided wherein said fourth light separating means is a dichroic prism.

BRIEF DESCRIPTION OF THE DRAWINGS

Figure 1A:
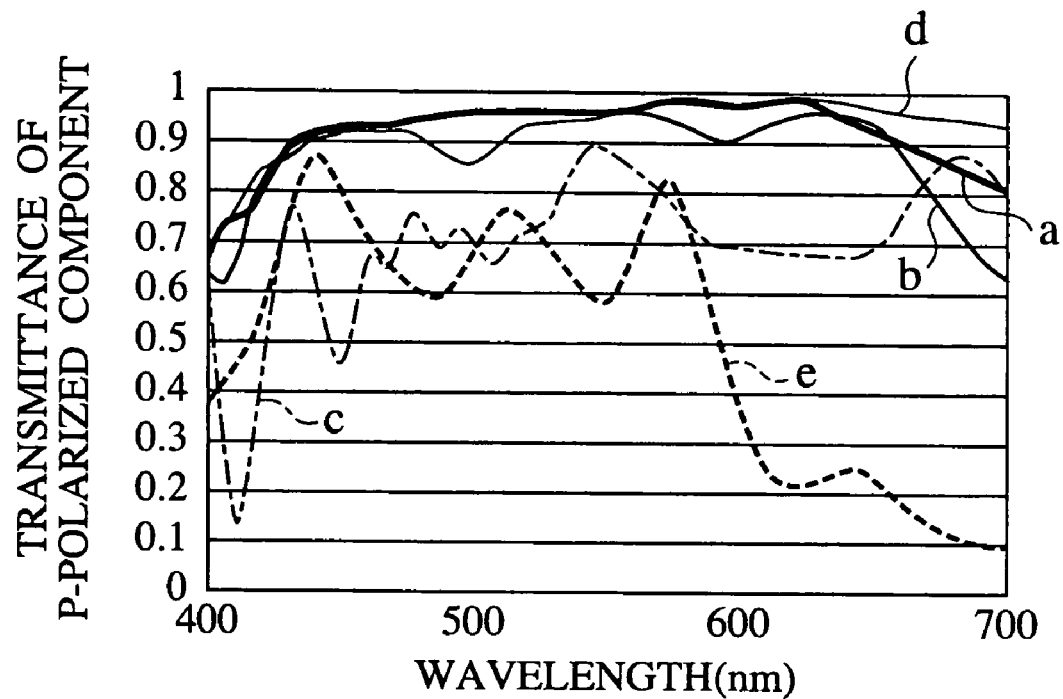
Figure 1B:
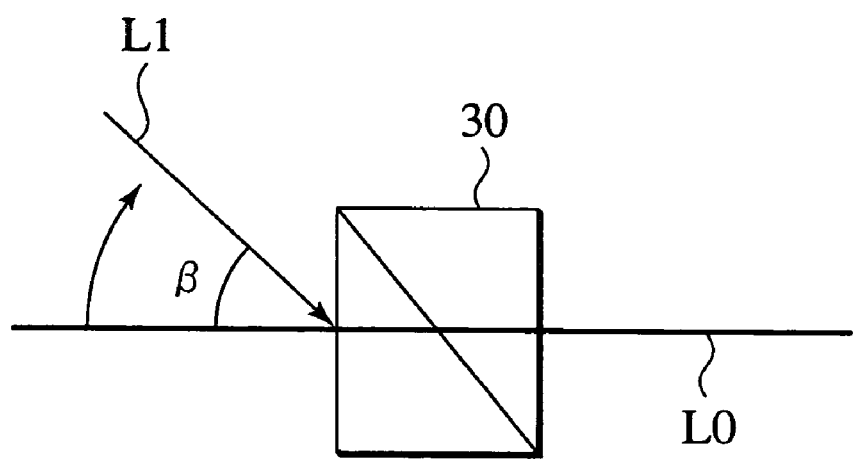

Having thus described the invention in general terms, reference will now be made to the accompanying drawings, which are not necessarily drawn to scale, and wherein:

FIG. 1A shows wavelength dependence of the rate of permeability p-polarized light in visible wavelength regions when the angle of incidence β depicted in FIG. 1B is a parameter.

FIG. 1B illustrates the angle of incidence β of incident light to the transmittance face of a polarized light beam splitter prism.

Figure 2:
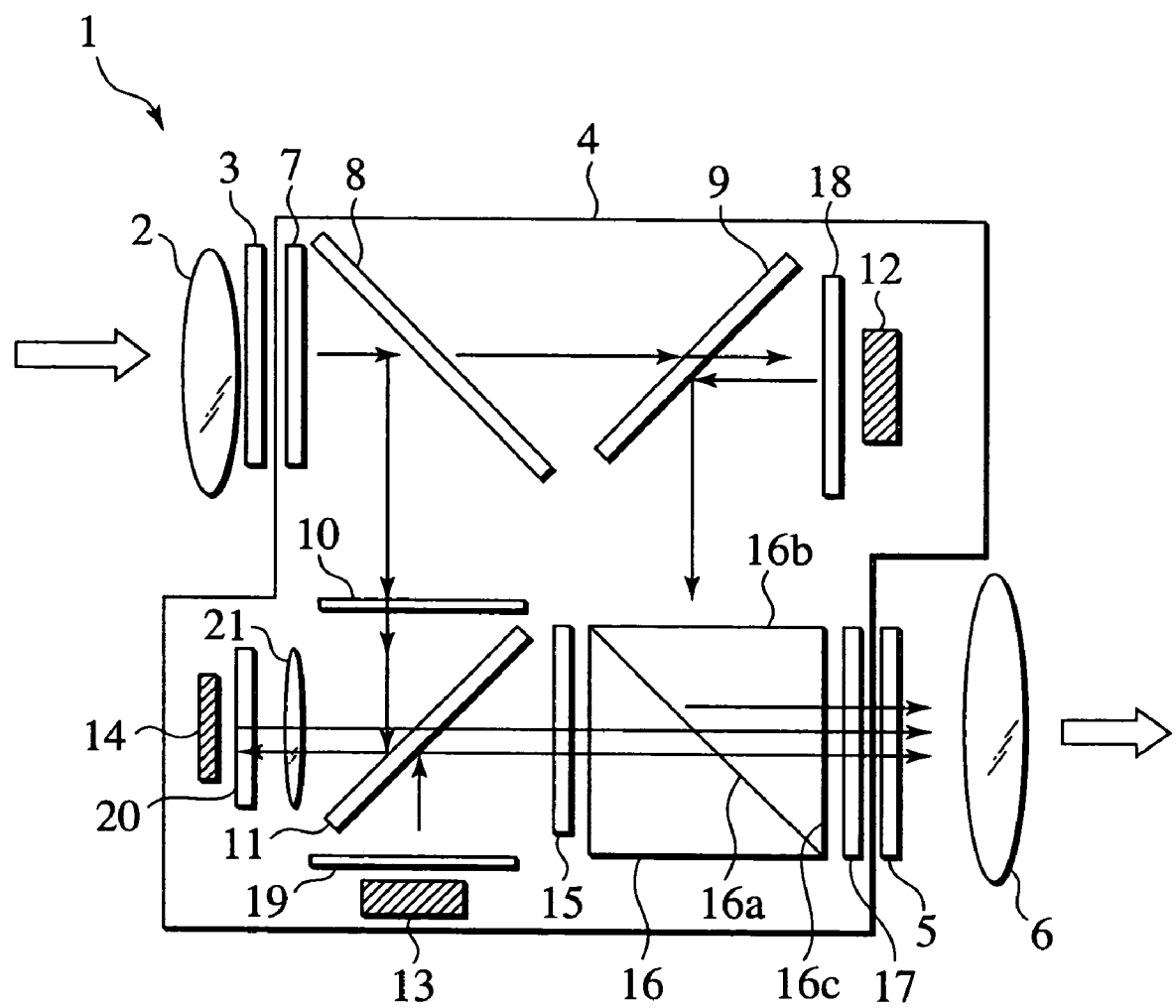

FIG. 2 depicts a projection display apparatus according to a first embodiment of the present invention.

Figure 3A:
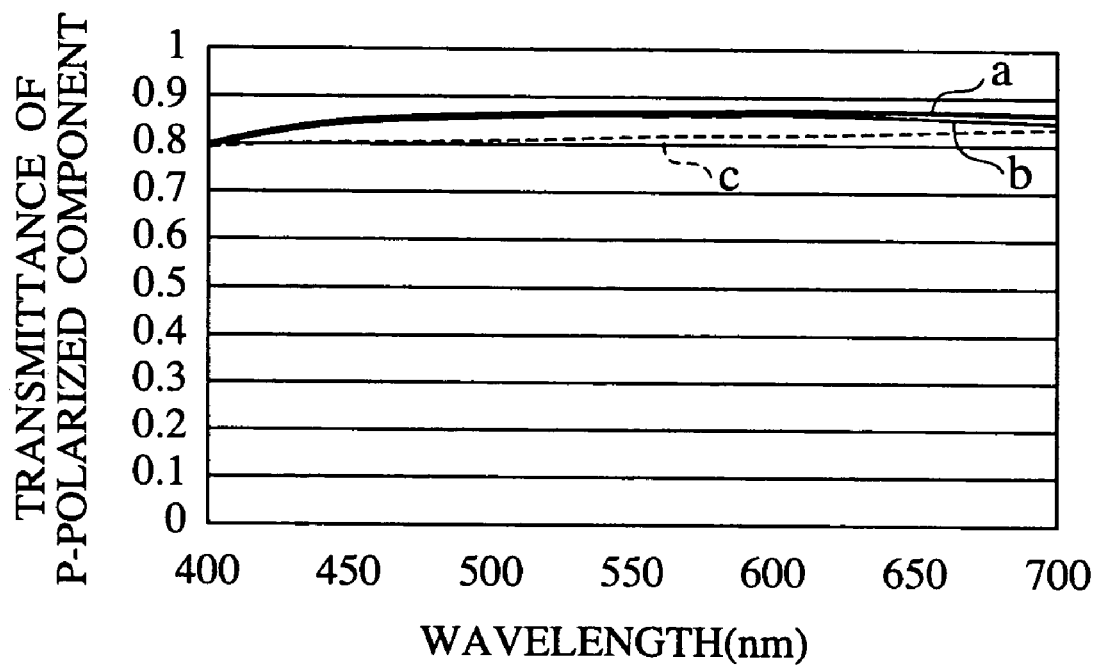
Figure 3B:
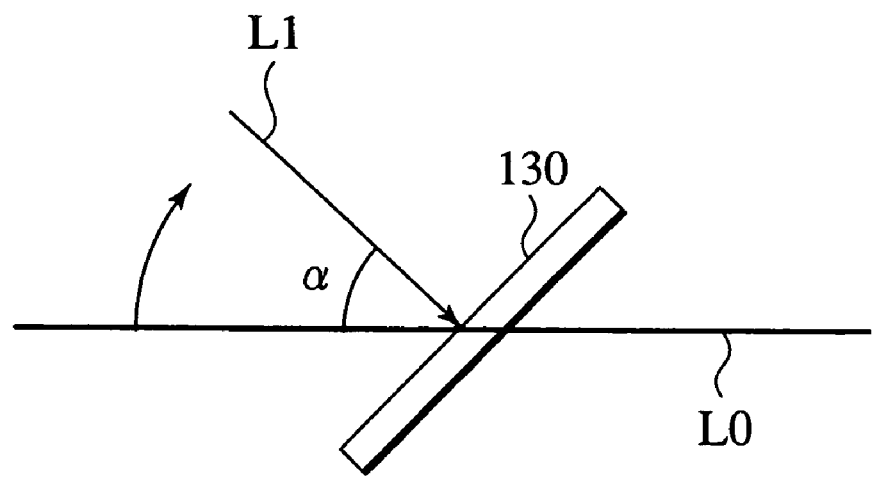

FIG. 3A shows wavelength dependence of the rate of permeability of p-polarized light when the angle of incidence α depicted in FIG. 3B is a parameter.

FIG. 3B illustrates the angle of incidence α of incident light to a wire grid polarized light separating plate.

Figure 4:
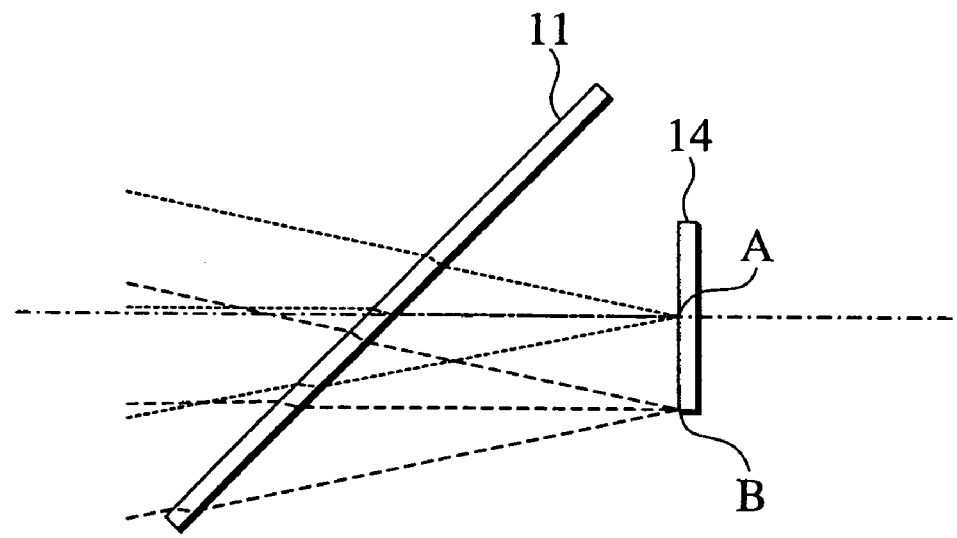

FIG. 4 is a schematic illustration of extracted sections along the optical path of the wire grid polarized light separating plate and reflective type spatial light modulating elements for blue light shown in FIG. 2, illustrating the case with no cylindrical lens.

Figure 5:
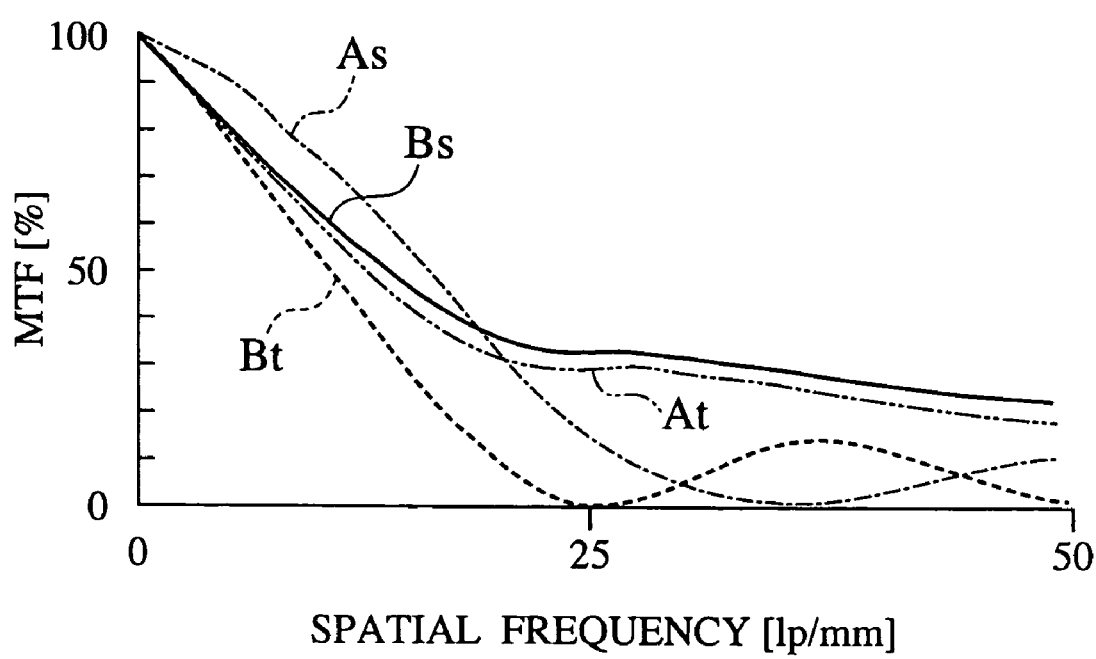

FIG. 5 shows the relationship of resolution and MTF in the case with no cylindrical lens.

Figure 6:
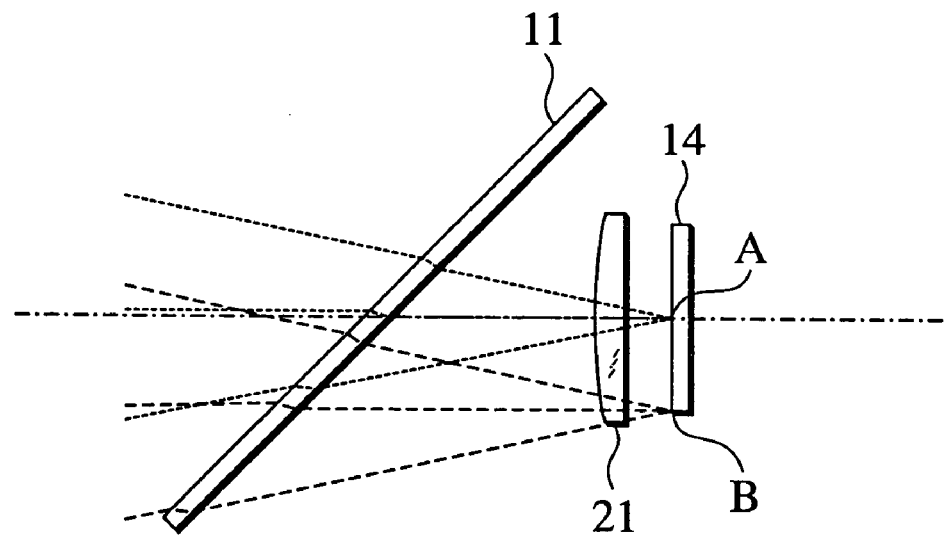

FIG. 6 is a schematic illustration of extracted sections along the optical path of the wire grid polarized light separating plate and reflective type spatial light modulating elements for blue light shown in FIG. 2, illustrating the case having a cylindrical lens.

Figure 7:
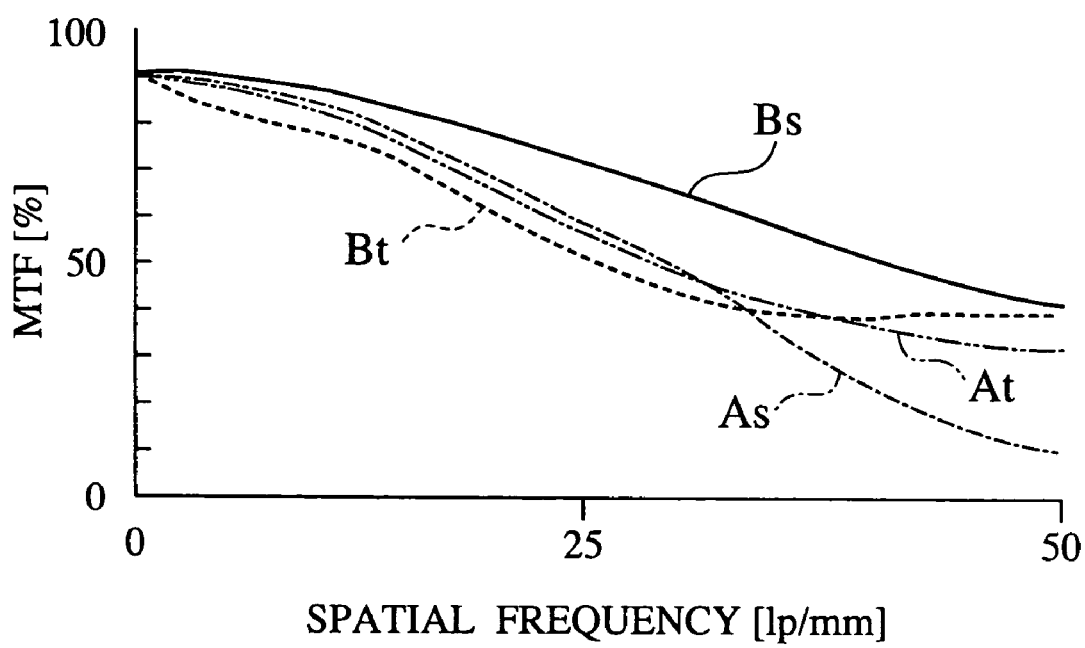

FIG. 7 shows the relationship of resolution and MTF in the case having a cylindrical lens.

Figure 8:
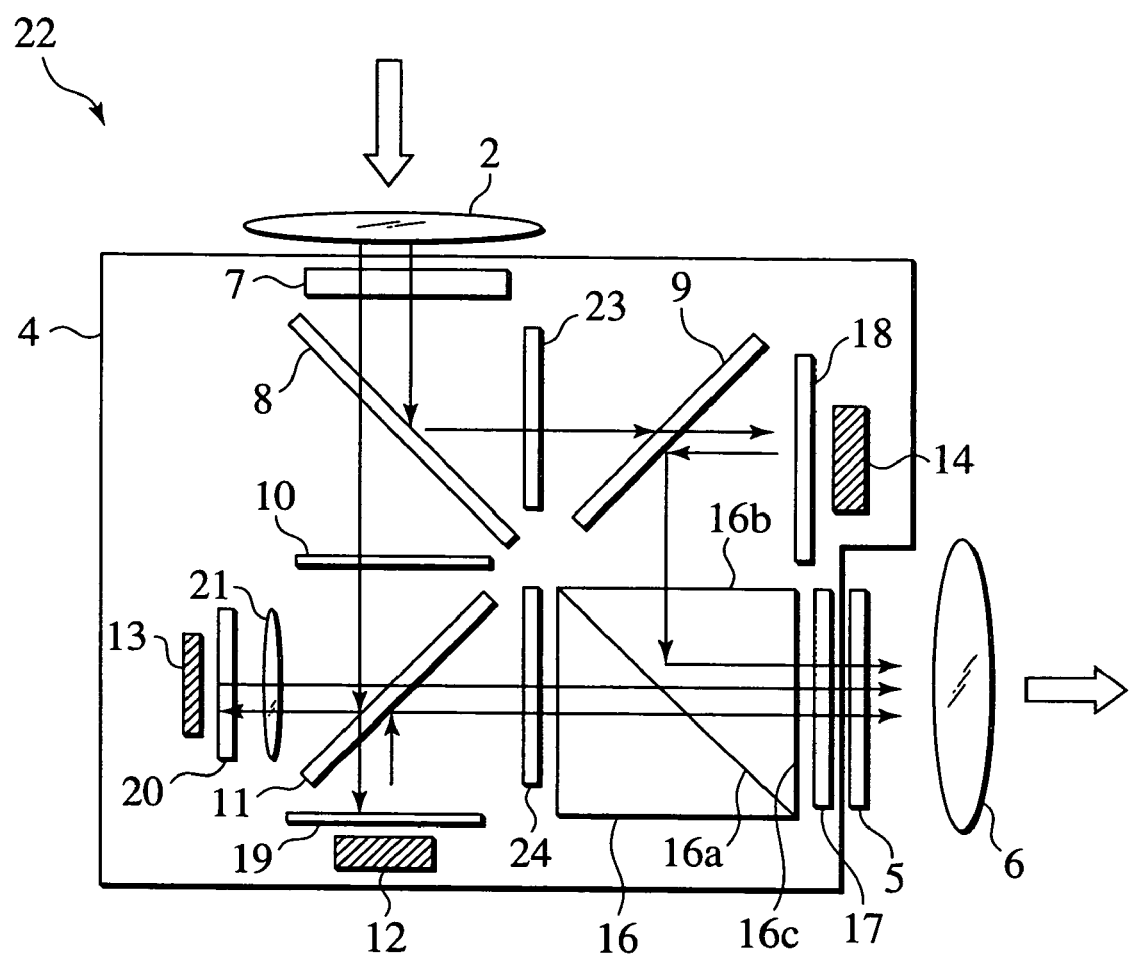

FIG. 8 shows a first modification of a projection display apparatus according to a first embodiment of the present invention.

Figure 9:
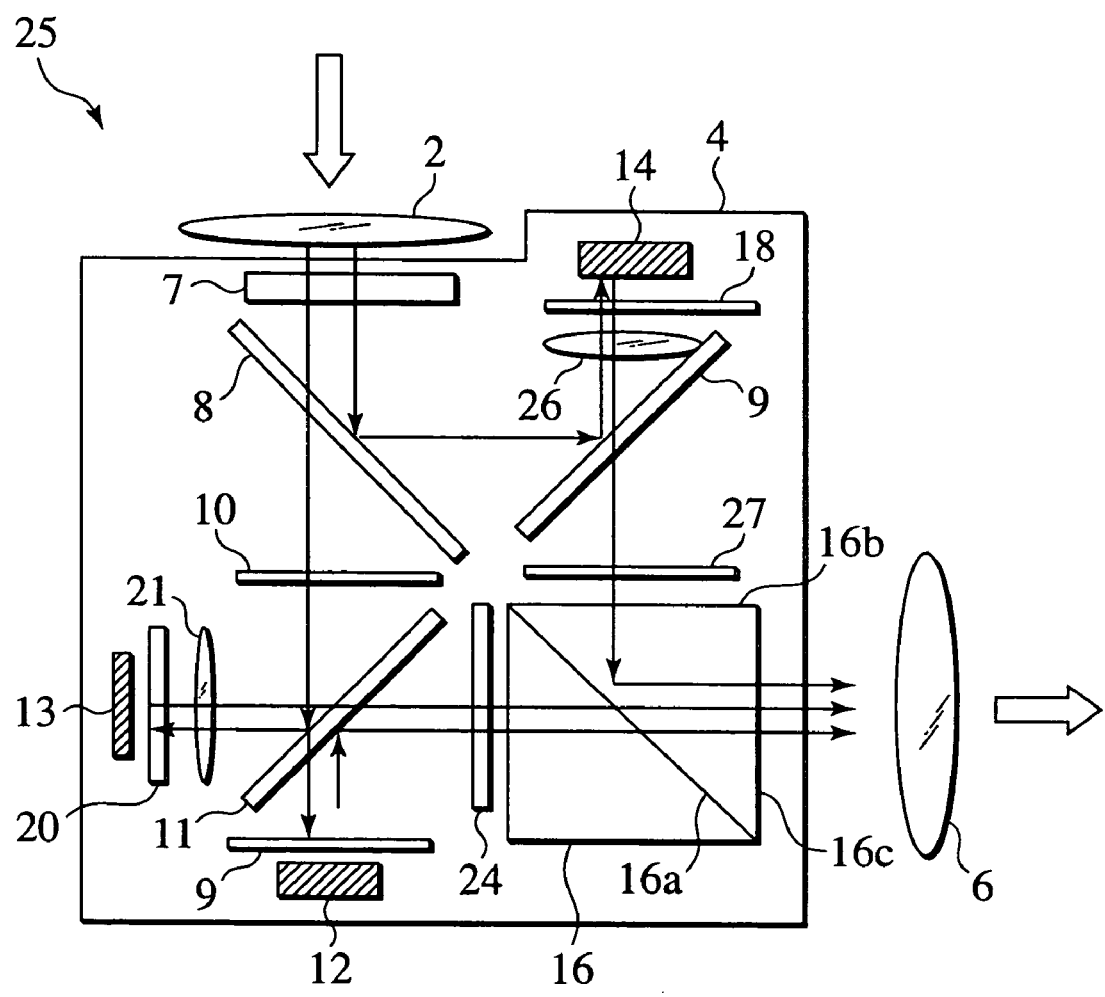

FIG. 9 shows a second modification of a projection display apparatus according to a first embodiment of the present invention.

Figure 10:
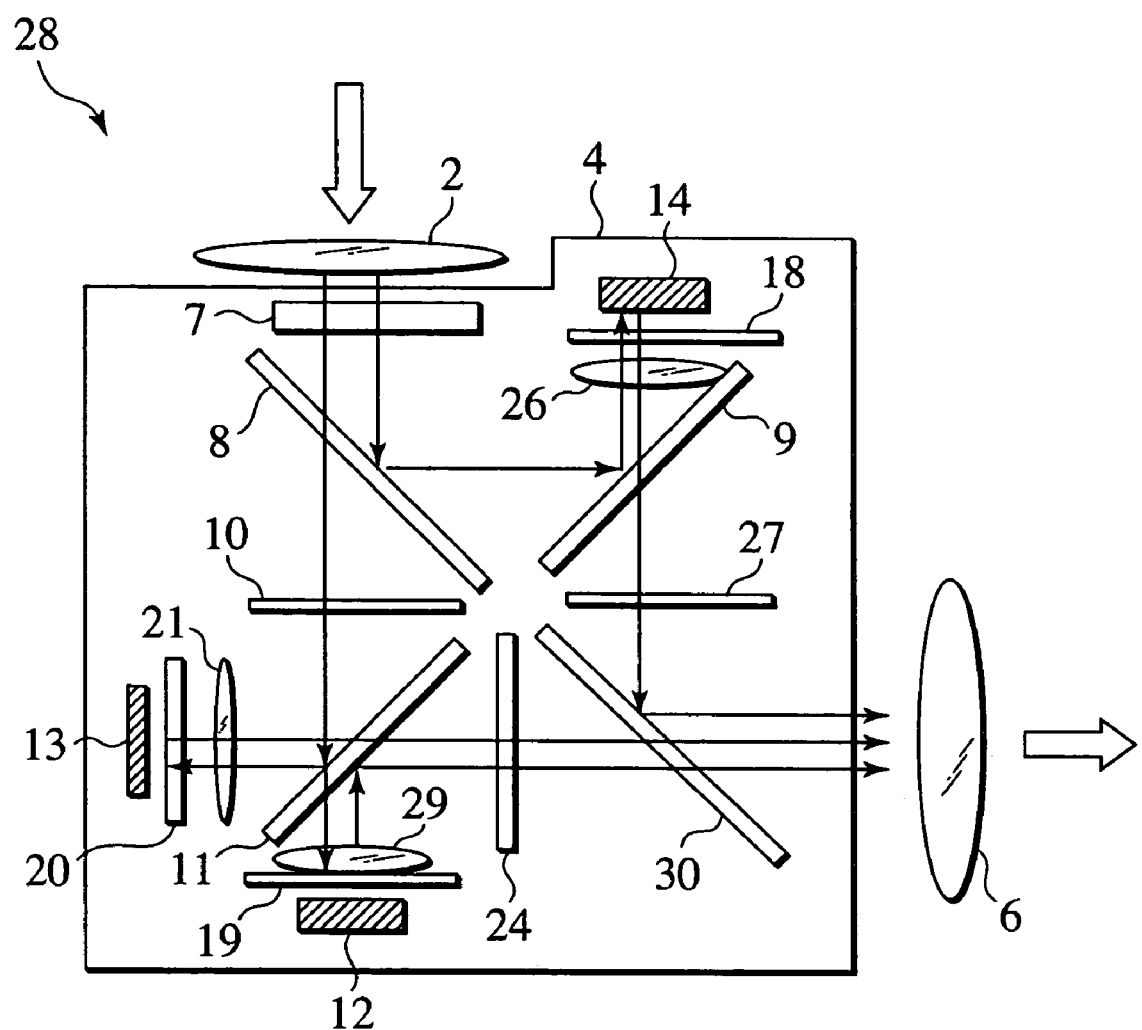

FIG. 10 shows a third modification of a projection display apparatus according to a first embodiment of the present invention.

Figure 11:
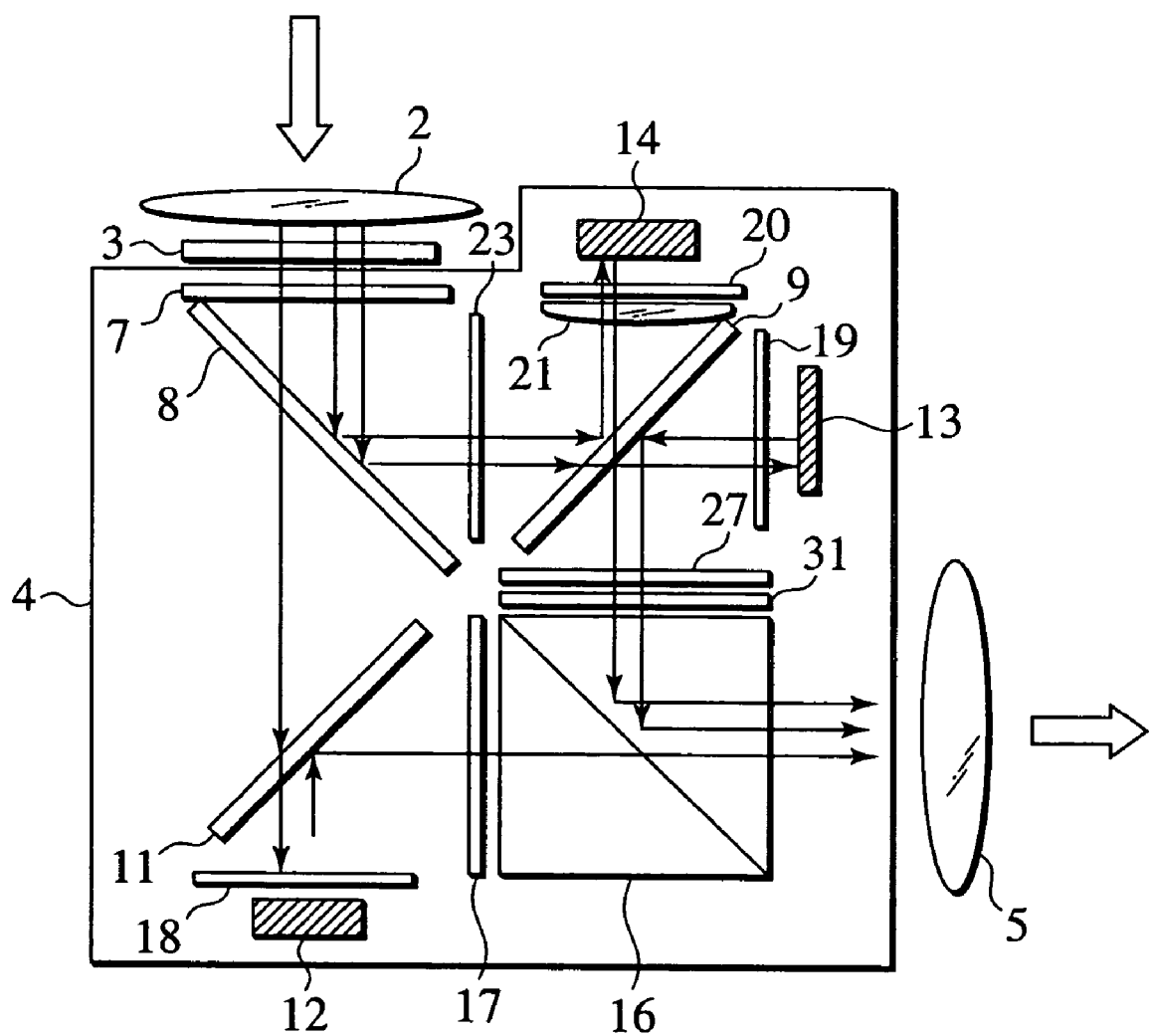

FIG. 11 shows a fourth modification of a projection display apparatus according to a first embodiment of the present invention.

Figure 12:
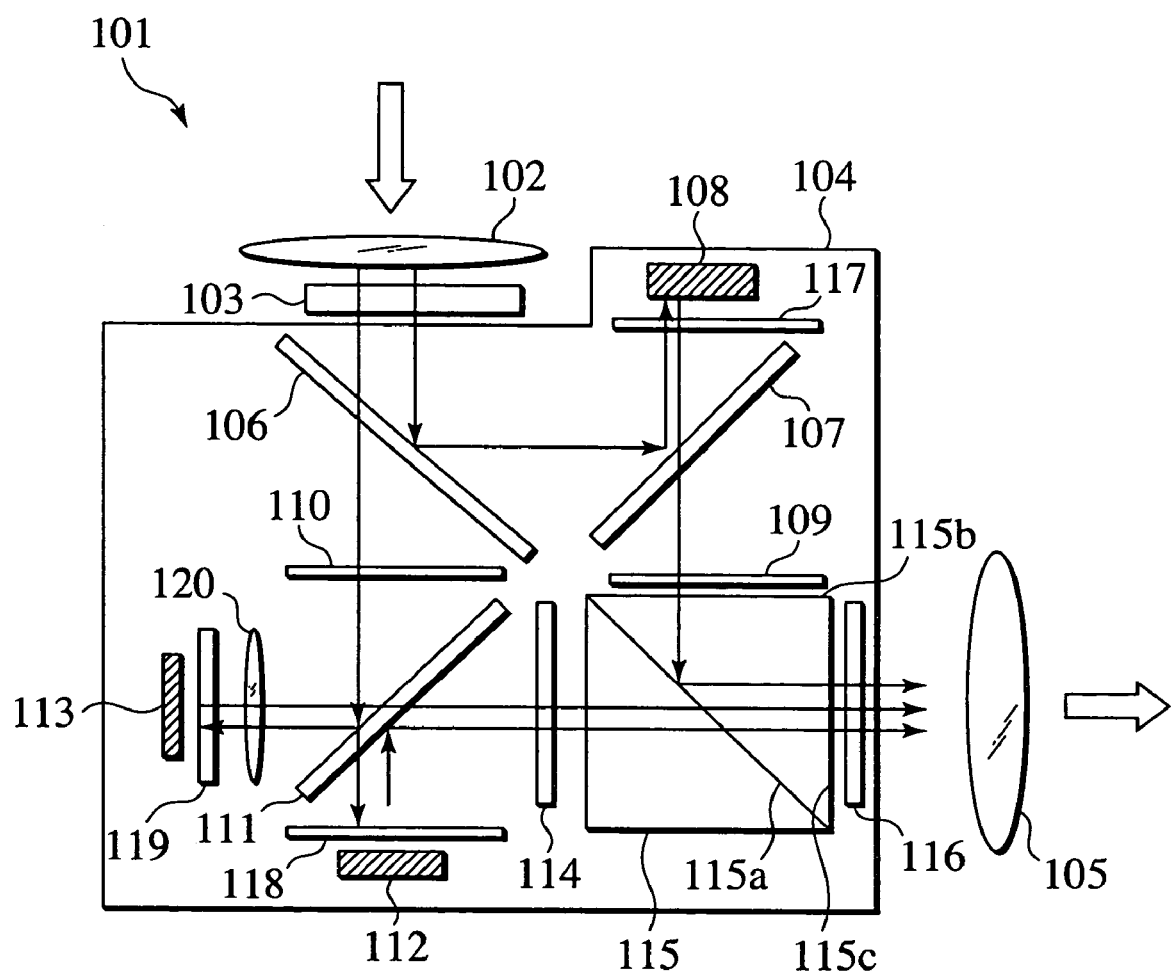

FIG. 12 depicts a projection display apparatus according to a second embodiment of the present invention.

Figure 13:
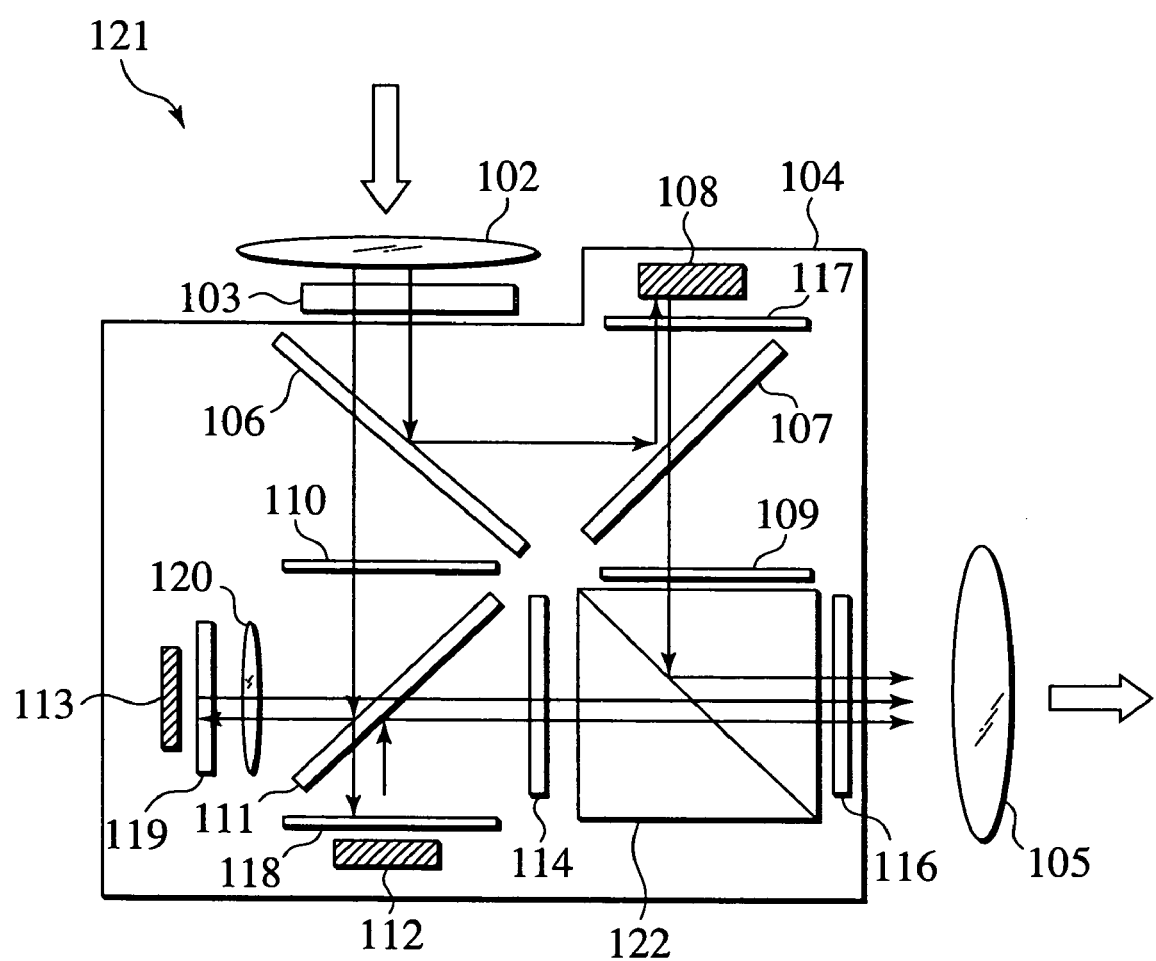

FIG. 13 shows a first modification of a projection display apparatus according to the second embodiment of the present invention.

Figure 14:
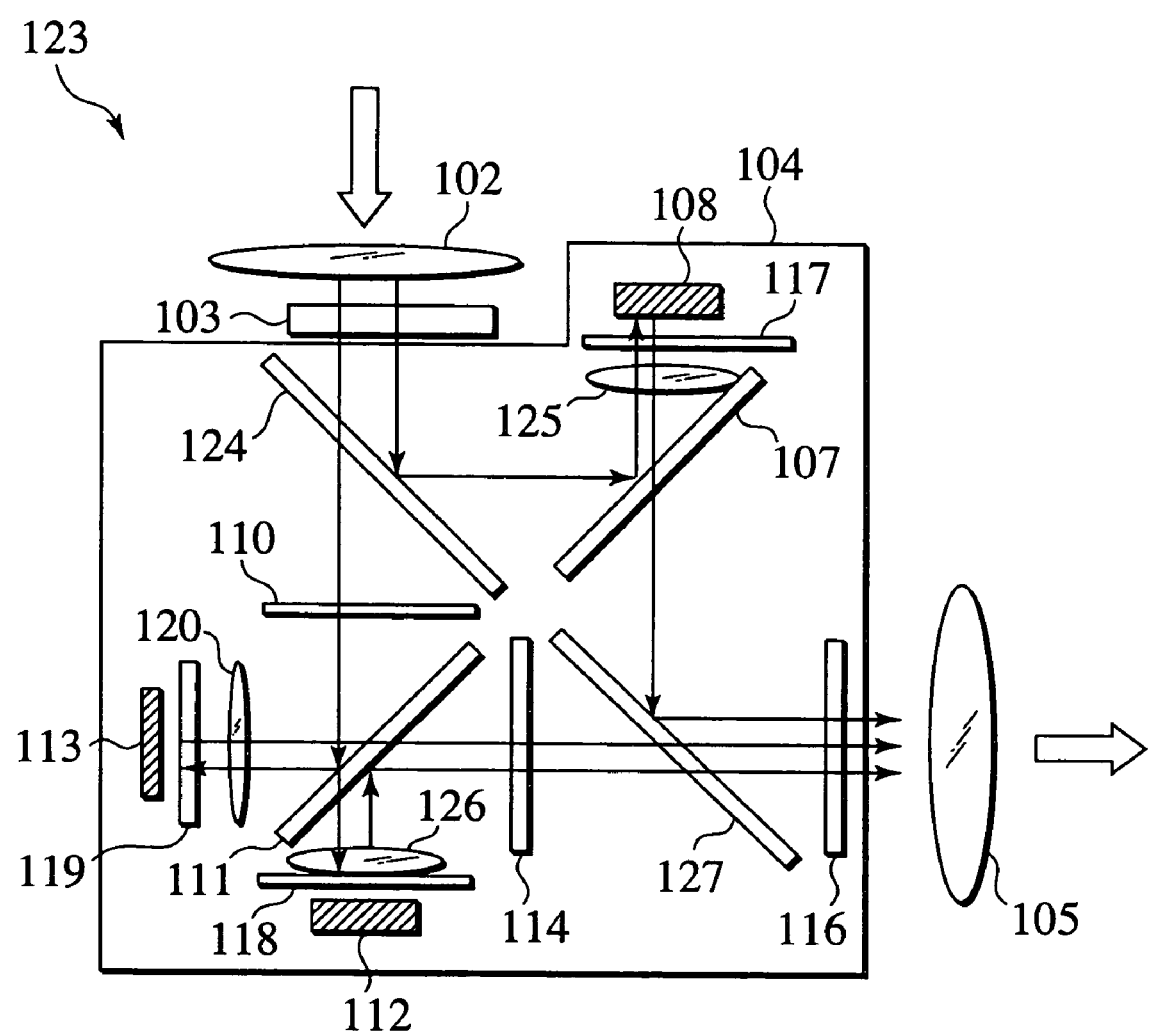

FIG. 14 shows a second modification of a projection display apparatus according to the second embodiment of the present invention.

Figure 15:
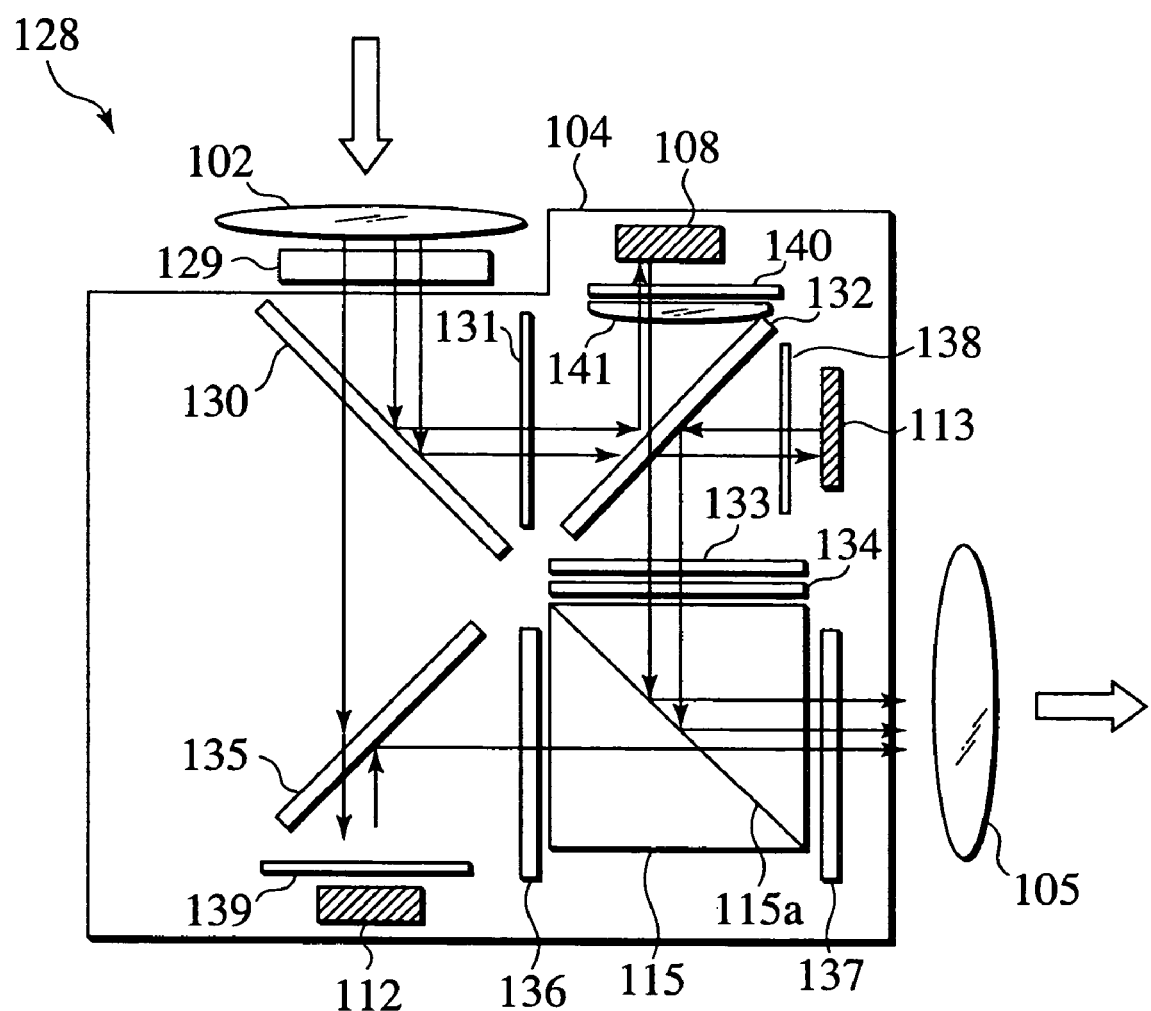

FIG. 15 shows a third modification of a projection display apparatus according to the second embodiment of the present invention.

Figure 16:
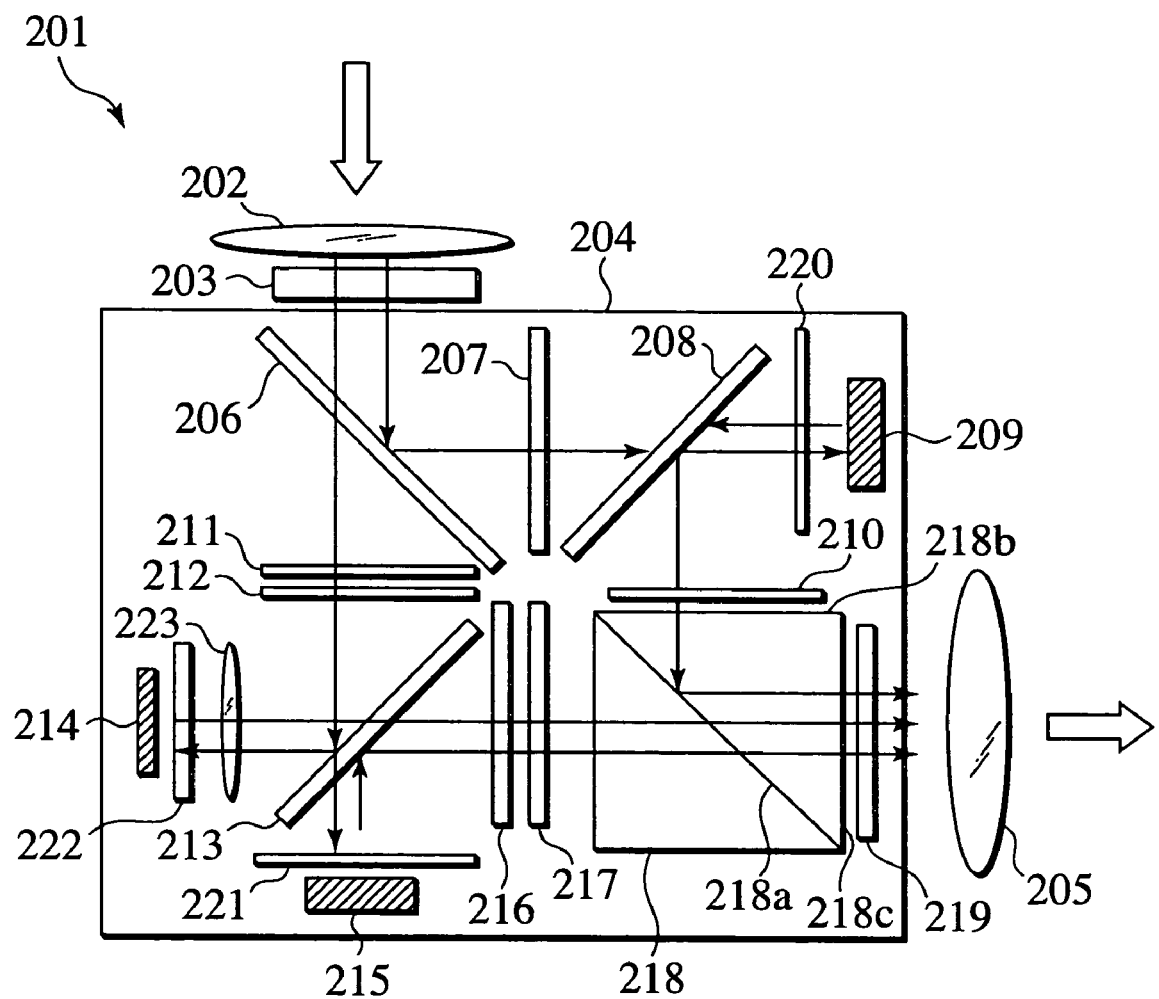

FIG. 16 depicts a projection display apparatus according to a third embodiment of the present invention.

Figure 17:
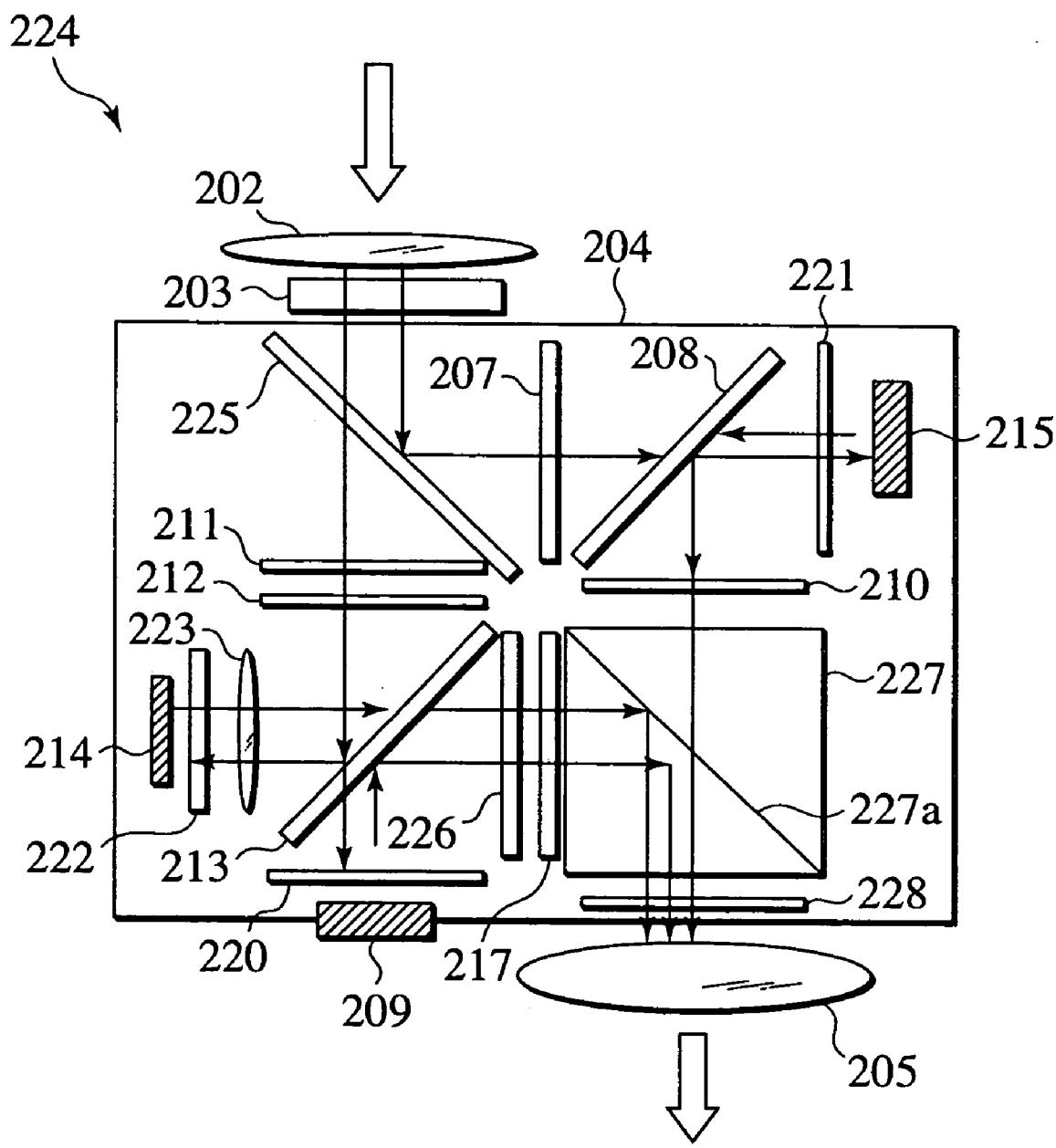

FIG. 17 shows a first modification of a projection display apparatus according to the third embodiment of the present invention.

Figure 18:
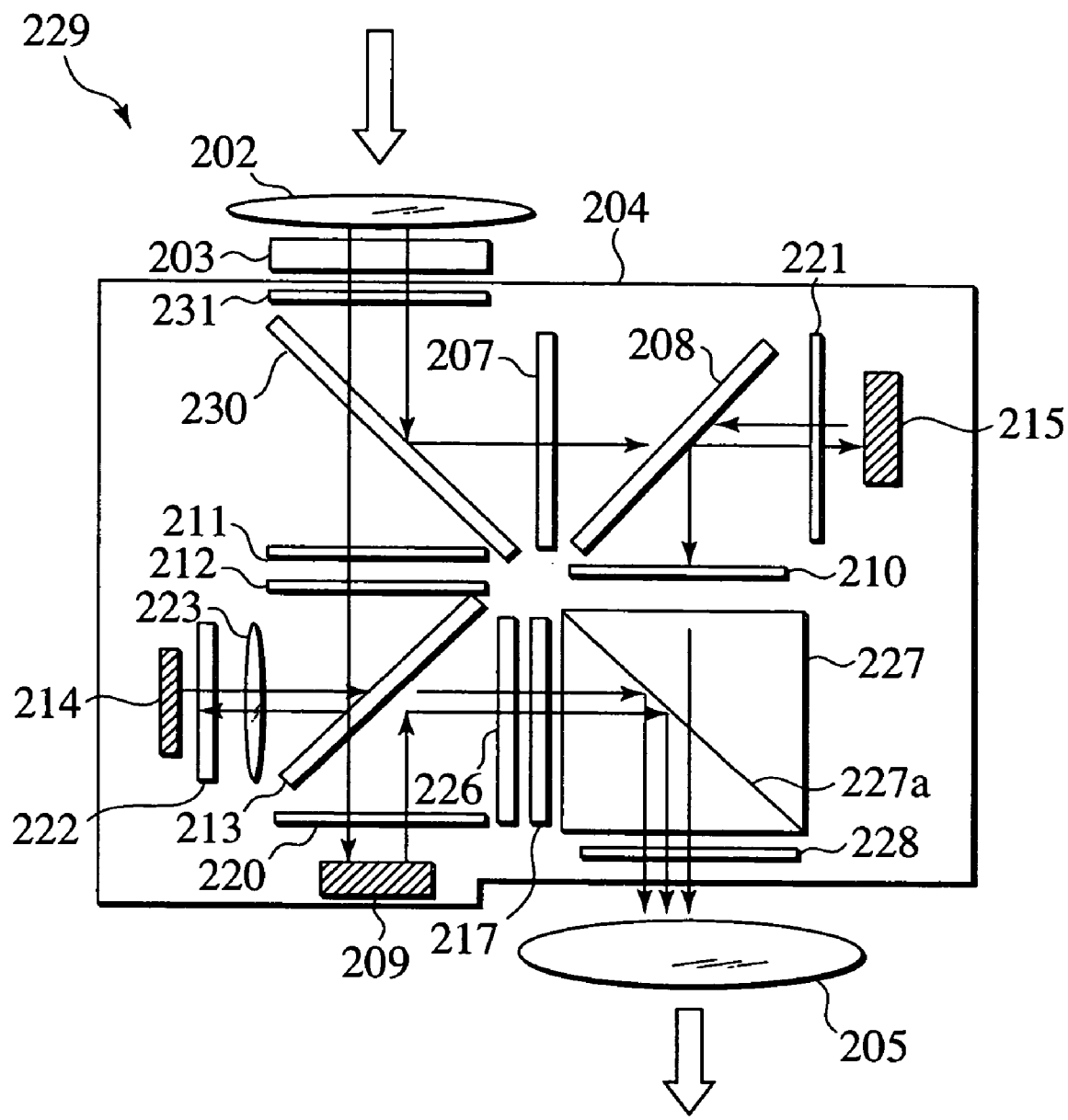

FIG. 18 shows a second modification of a projection display apparatus according to the third embodiment of the present invention.

DETAILED DESCRIPTION OF THE INVENTION

The present invention now will be described more fully hereinafter with reference to the drawings, in which preferred embodiments of the invention are shown. This invention may, however, be embodied in many different forms and should not be construed as limited to the embodiments set forth herein; rather, these embodiments are provided so that this disclosure will be through and complete, and will fully convey the scope of the invention to those skilled in the art. Like numbers refer to like elements throughout.

Embodiment 1

FIG. 2 depicts a projection display apparatus according to a first embodiment of the present invention. FIG. 3A and FIG. 3B show wavelength dependence of rate of permeability of p-polarized light when the angle of incidence α of incident light to a wire grid polarized light separating plate is the parameter. FIG. 4 is a schematic illustration of extracted sections along the optical path of the wire grid polarized light separating plate and reflective type spatial light modulating elements for blue light shown in FIG. 2, illustrating the case with no cylindrical lens. FIG. 5 shows the relationship of resolution and MTF in the case with no cylindrical lens. FIG. 6 is a schematic illustration of extracted sections along the optical path of the wire grid polarized light separating plate and reflective type spatial light modulating elements for blue light shown in FIG. 2, illustrating the case having a cylindrical lens. FIG. 7 shows the relationship of resolution and MTF in the case having a cylindrical lens. FIG. 8 shows a first modification of a projection display apparatus according to a first embodiment of the present invention. FIG. 9 shows a second modification of a projection display apparatus according to a first embodiment of the present invention. FIG. 10 shows a third modification of a projection display apparatus according to a first embodiment of the present invention. FIG. 11 shows a fourth modification of a projection display apparatus according to a first embodiment of the present invention.

As shown in FIG. 2 a projection display apparatus related to a first embodiment of the present invention comprises, horizontally, a lens 2 for concentrating light formed by a polarized light conversion plate or the like into nearly s-polarized light from light of indeterminate polarity, a primary polarizing panel 3 selected for a permeation axis for passing linearly polarized light having a relationship only to s-polarized light emitted from this lens 2, a color separation and synthesis optical system 4, for breaking down linearly polarized light emitted from this primary polarizing panel 3 into the three primary colors and, after modulating these separated three primary colors in relation to a respective image signal for each color light, performing color synthesis and forming a color image, a secondary polarizing panel 5 selected for a permeation axis for passing only linearly polarized light having a relationship to p-polarized light of color images color synthesized at the color separation and synthesis optical system 4, and a projection lens 6 for performing expansive projection of color images that have become p-polarized light.

The color separation and synthesis optical system 4 comprises a primary phase plate for green light 7 that rotates 90° the plane of polarization of green light among the s-polarized light passing the primary polarizing panel 3 making that green light p-polarized light and passes other s-polarized lights, a primary wire grid polarized light separating plate 8, disposed at an angle of 45° in relation to the optical axis of green light, that passes p-polarized green light among light of the three primary colors passing the primary phase plate for green light 7 and reflects other s-polarized lights, a secondary wire grid polarized light separating plate 9 disposed at an angle of 135° in relation to the optical axis of green light, that passes p-polarized green light passing the primary wire grid polarized light separating plate 8 and reflects s-polarized green light, a primary phase plate for red light 10 that rotates 90° the plane of polarization of red light among other s-polarized lights reflected at the primary wire grid polarized light separating plate 8 making that red light p-polarized light, and a tertiary wire grid polarized light separating plate 11 disposed at an angle of 45° in relation to the optical axis of red light, that passes p-polarized red light among red light and other light (blue light) passing the primary phase plate for red light 10 and reflects s-polarized blue light.

Further, the color separation and synthesis optical system 4 comprises, reflective type spatial light modulating elements for green light 12 disposed on the side of the secondary wire grid polarized light separating plate 9 of passed green light, that modulate the light of p-polarized green light in coordination with an image signal making that green light into s-polarized light and reflecting that green light, reflective type spatial light modulating elements for red light 13 disposed on the side of the tertiary wire grid polarized light separating plate 11 of passed red light, that modulate the light of p-polarized red light in coordination with an image signal making that red light into s-polarized light and reflecting that red light, reflective type spatial light modulating elements for blue light 14 disposed on the side of the tertiary wire grid polarized light separating plate 11 of reflected blue light, that modulate the light of s-polarized blue light in coordination with an image signal making that blue light into p-polarized light and reflecting that blue light, and a secondary phase plate for red light 15 that rotates 90° the plane of polarization of s-polarized red light reflected and emitted from the reflective type spatial light modulating elements for red light 13 and reflected at the tertiary wire grid polarized light separating plate 11, making that red light into p-polarized light.

Moreover, the color separation and synthesis optical system 4 comprises a polarized light beam splitter prism 16 having a polarized light separating surface 16*a* that while reflecting s-polarized green light reflected and emitted from the reflective type spatial light modulating elements for green light 12 and reflected at the secondary wire grid polarized light separating plate 9, passes, blue light passing the secondary phase plate for red light 15 in the p-polarized condition red light made into p-polarized light therein and a secondary phase plate for green light 17 that passes p-polarized red light and blue light emitted from the polarized light beam splitter prism 16 and rotates 90° the plane of polarization of s-polarized green light, making that green light into p-polarized light.

A primary wavelength plate 18 is disposed between the secondary wire grid polarized light separating plate 9 and the reflective type spatial light modulating elements for green light 12 and a secondary wavelength plate 19 is disposed between the tertiary wire grid polarized light separating plate 11 and the reflective type spatial light modulating elements for red light 13. Further, between the tertiary wire grid polarized light separating plate 11 and the reflective type spatial light modulating elements for blue light 14, disposed in order from the side of the reflective type spatial light modulating elements for blue light 14 facing inwards with respect to the tertiary wire grid polarized light separating plate 11 are firstly, a tertiary wavelength plate 20 followed by a cylindrical lens 21 for correcting astigmatism arising when blue light reflected at the reflective spatial light modulating elements for blue light 14 passes the tertiary wire grid polarized light separating plate 11.

The primary wavelength plate 18 is for correcting the condition of polarization of liquid crystal pretilt angle of green light reflected at the reflective type spatial light modulating elements for green light 12. The tertiary wavelength plate 20 is for correcting the condition of polarization of liquid crystal pretilt angle of blue light reflected at the reflective type spatial light modulating elements for blue light 14. The secondary wavelength plate 19 is for correcting the condition of polarization of liquid crystal pretilt angle of the reflective type spatial light modulating elements for red light 13.

Each of the wavelength plates uses either ¼ or ½ wavelength plate coordinated to the respective colors. It is sufficient for correction of liquid crystal pretilt angle to be of a very small degree, and a wavelength plate for very fine quantity below 1/10 wavelength or further, below 1/20 wavelength is preferable. When actually installing the wavelength plates the setting for the direction of the optical axis is performed by displaying a uniform black image on the reflective type spatial light modulating elements and adjusting until the image projected on screen is in the darkest condition possible.

Wavelength dependence of rate of permeability of p-polarized light when light incident to the wire grid polarized light separating plate is input at an angle of incidence α will now be explained with reference to FIG. 3A and FIG. 3B.

FIG. 3A shows the cases where the angles of incidence α of light incident L1 to a wire grid polarized light separating plate 130 are 'a' is zero°, 'b' is −15° and 'c' is +15°. The angle of incidence α is the angle between the incident light L1 to the wire grid polarized light separating plate 130 and the optical axis L0.

As shown in FIG. 3A, even when the angle of incidence is broader than conventionally, being ±15°, wavelength dependence of the rate of permeability of p-polarized light is, in visible wavelength regions, extremely small and stable. Accordingly, it is evident that if a wire grid polarized light separating plate is used instead of a polarized light beam splitter prism it is possible to realize a projection display apparatus that projects brightly and achieves good color reproducibility. Unlike a polarized light beam splitter prism, the wire grid polarized light separating plate is light because it consists of a single, planar shaped, polarized light separating plate. Further, even when such a wire grid polarized light separating plate is incorporated into a projection display apparatus deterioration in the quality of an image due to double refraction can be suppressed because light emitted from the light source is not absorbed easily.

Next, astigmatism correcting cylindrical lens 21, characteristic of the third embodiment of this invention, will now be described, referring to FIGS. 4 to 7, showing the effect of disposing the tertiary wire grid polarized light separating plate 11 on the side of the reflective type spatial light modulating elements for blue light 14 of reflected blue light.

In FIG. 5 and FIG. 7 As is the curve for MTF (Modulation Transfer Function) of the sagittal direction at the center position of the reflective type spatial light modulating elements for blue light 14, At is the curve for MTF of the tangential direction at the center position of the reflective type spatial light modulating elements for blue light 14, Bs is the curve for MTF of the sagittal direction at the end of the reflective type spatial light modulating elements for blue light 14 and Bt is the curve for MTF of the sagittal direction at the end of the reflective type spatial light modulating elements for blue light 14. In those Figs. MTF (%) is plotted against the vertical axis and spatial frequency (lp/mm, linepair/millimeters) is plotted against the horizontal axis.

Resolution performance is generally assessed using MTF. MTF is the degree to which contrast of a grid lined image that is the subject can be faithfully reproduced via a lens; fine contrast approaching 100% indicating that image resolution is possible. In the case of a projection lens, if MTF is above 50% it can be said that this realizes what is in practice, a high degree of resolution.

For example, if pixel pitch is 20 μm in both horizontal and vertical directions of reflective type spatial light modulating elements, spatial frequency equivalent to that pixel pitch is 25 lp/mm, so MTF above 50% provides the conditions for obtaining a high-resolution image.

When indicating resolution, because a main light beam is not over the optical axis of the optical system, a phenomena occurs in which the points of image formation of the tangential elements and the sagittal elements of light beams do not match, therefore it is normal to indicate the MTF characteristics of each of those respective elements.

Because the wire grid polarized light separating plates are disposed at an angle of 45° or 135° in relation to the optical axis, substantial astigmatism arises because in light transversing the plates difference arises in refraction at the boundary face of the wire grid polarized light separating plates for the sagittal elements and the tangential elements. Here, astigmatism refers to the aberration wherein the image formation points of the sagittal and tangential elements of a light ray do not match.

When there is no cylindrical lens 21 disposed between the tertiary wire grid polarized light separating plate 11 and the reflective type spatial light modulating elements for blue light 14 as in the case shown in FIG. 4, MTF is approximately 20% at spatial frequency 25 lp/mm as shown in FIG. 5, which is not practical.

When the cylindrical lens 21 is disposed between the tertiary wire grid polarized light separating plate 11 and the reflective type spatial light modulating elements for blue light 14 as in the case shown in FIG. 6, the cylindrical lens 21 acts as a lens on the sagittal elements of blue light reflected from the reflective type spatial light modulating elements for blue light 14, acting to make the image formation point of tangential elements of blue light passing the tertiary wire grid polarized light separating plate 11 close to the image formation point of sagittal elements of that blue light. The result, as shown in FIG. 7, is that MTF at spatial frequency 25 lp/mm, is a high resolution exceeding 50%, which is practical.

The tertiary wire grid polarized light separating plate 11 is a glass plate of a thickness of 1 mm. The cylindrical lens 21 is BK 7 material, of a thickness of 2 mm and a radius of 75 mm. The cylindrical lens 21 is disposed having the convex surface thereof facing the tertiary wire grid polarized light separating plate 11.

Thus, where the cylindrical lens 21 is disposed between the tertiary wire grid polarized light separating plate 11 and the reflective type spatial light modulating elements for blue light 14, this enables astigmatism arising at the tertiary wire grid polarized light separating plate 11 to be slightly corrected, thereby enabling high resolution images to be obtained.

The operation of this embodiment will now be described with reference to the drawings.

In the projection display apparatus 1 related to the first embodiment of this invention shown in FIG. 2, light of the three primary colors, already formed into p-polarized light from light of indeterminate polarity by a polarizing panel or the like, is input to the lens 2. The light of the three primary colors focused at this lens 2 is then input to the primary polarizing panel 3. At the primary polarizing panel 3 only linearly polarized light that is s-polarized light is passed from this light of three primary colors, and this passed light then enters the primary phase plate for green light 7. As the primary phase plate for green light 7 is a wavelength selective polarized light conversion means that rotates the plane of polarization of only green light 90°, s-polarized light that is the light passing the primary phase plate for green light 7 is converted into p-polarized light 7. Further, as the primary phase plate for green light 7 does not operate on red light or blue light these remain s-polarized lights.

P-polarized green light passing the primary phase plate for green light 7 advances directly through the primary wire grid polarized light separating plate 8 and the secondary wire grid polarized light separating plate 9 and passing via the primary wavelength plate 18, undergoes light modulation coordinated to an image signal for green at the reflective type spatial light modulating elements for green light 12 before being reflected.

S-polarized light elements of modulated green light thus generated are reflected again at the secondary wire grid polarized light separating plate 9, entering the polarized light beam splitter prism 16 via a transmissive surface 16*b* thereof, wherein this light is reflected at a polarized light separation surface 16*a* of the polarized light beam splitter prism 16 so as to enter the secondary phase plate for green light 17, which functions to rotate the plane of polarization of this green light 90° as described, so that s-polarized green light is converted into p-polarized light and emitted.

The operation of this embodiment will now be described with respect to red light.

In the projection display apparatus 1 shown in FIG. 2 s-polarized red light passing the primary phase plate for green light 7 is reflected at the primary wire grid polarized light separating plate 8, entering the primary phase plate for red light 10. As the primary phase plate for red light 10 is a wavelength selective polarized light conversion means that rotates the plane of polarization of red light 90°, the red light is polarized from s-polarized light to p-polarized light and emitted, from where this red light enters the tertiary wire grid polarized light separating plate 11. This p-polarized red light passes the tertiary wire grid polarized light separating plate 11 entering the reflective type spatial light modulating elements for red light 13 via the secondary wavelength plate 19. At the reflective type spatial light modulating elements for red light 13 this red light undergoes light modulation coordinated to an image signal for red and is reflected.

S-polarized light elements of modulated red light thus generated are reflected at the tertiary wire grid polarized light separating plate 11, entering the secondary phase plate for red light 15 wherein s-polarized light elements of this red light are converted into p-polarized light, before being input to the polarized light beam splitter prism 16. This light then passes directly through the polarized light separating surface 16*a* therein so as to enter the secondary phase plate for green light 17. The secondary phase plate for green light 17 does not affect this red light, which is emitted from the secondary phase plate for green light 17 as p-polarized light.

The operation of this embodiment will now be described with respect to blue light.

In the projection display apparatus 1 shown in FIG. 2 s-polarized blue light passing the primary phase plate for green light 7 is reflected at the primary wire grid polarized light separating plate 8, entering the primary phase plate for red light 10. The primary phase plate for red light 10 only operates on red light, and therefore does not affect this blue light which is emitted therefrom as s-polarized light having undergone no light polarization conversion and enters the tertiary wire grid polarized light separating plate 11.

S-polarized blue light is reflected at the tertiary wire grid polarized light separating plate 11, entering the reflective type spatial light modulating elements for blue light 14 via the cylindrical lens 21 and the tertiary wavelength plate 20. At the reflective type spatial light modulating elements for blue light 14 this blue light undergoes light modulation coordinated to an image signal for blue light and is reflected.

After undergoing correction of the light polarization condition of the liquid crystal pretilt angle at the tertiary wavelength plate 20, the p-polarized blue light thus modulated is directed into the cylindrical lens 21, which corrects the astigmatism of the tangential and sagittal elements of this p-polarized blue light and directs that light into the tertiary wire grid polarized light separating plate 11. The p-polarized blue light then passes directly through the tertiary wire grid polarized light separating plate 11 entering the secondary phase plate for red light 15. As described, the secondary phase plate for red light 15 does not operate with respect to blue light therefore this blue light is emitted therefrom as p-polarized light, entering the polarized light beam splitter prism 16. The blue light then passes directly through the polarized light separating surface 16*a* therein and is emitted from the transmittance face 16*c*, entering the secondary phase plate for green light 17 disposed at the subsequent stage.

As described, the secondary phase plate for green light 17 acts only on green light therefore this blue light is emitted therefrom as p-polarized light.

In this way, red light, green light and blue light the respective planes of polarization of which are made into P polarization are projected in color, expansively displayed, via the secondary polarizing panel 5 that passes only light of P polarization and the projection lens 6, on a screen not shown in the drawing.

As described, as the first embodiment of the present invention provides a cylindrical lens 21 disposed between the tertiary wire grid polarized light separating plate 11 and the reflective type spatial light modulating elements for blue light 14, astigmatism arising at the tertiary wire grid polarized light separating plate 11 can be slightly corrected thereby enabling high resolution images to be obtained.

Further, as the wavelength dependence of the ratio of permeability of light of P polarization is small and the planar shaped wire grid polarized light separating plates 8, 9 and 11 are used, the projection display apparatus of this embodiment is lightweight and enables high-quality images to be obtained because double refraction due to thermal distribution does not arise.

This embodiment was described with respect to conversion of light of the three primary colors into s-polarized light as light of indeterminate polarity passes a polarizing panel or the like, however this embodiment also operates in the same manner with respect to converting light of indeterminate polarity into p-polarized light.

First Modification of the First Embodiment

A first modification of the first embodiment according to the present invention will now be described with reference to FIG. 8. The same symbols apply with respect to the parts of this first modification that are the same as those of the first embodiment as described, therefore an explanation of each of those parts is omitted here.

As shown in FIG. 8, a projection display apparatus 22 according to a first modification of the first embodiment of the present invention comprises a system of the projection display apparatus 1 of the first embodiment as described having a lens 2 and a primary phase plate for green light 7 both arranged above a primary wire grid polarized light separating plate 8 as in the case of the first embodiment; reflective type spatial light modulating elements for green light 12 disposed on the side of the secondary wavelength plate 19 having the tertiary wire grid polarized light separating plate 1, which is the opposite arrangement to that of the first embodiment; a reflective type spatial light modulating elements for red light 13 disposed on the side of the tertiary wavelength plate 20 having the tertiary wire grid polarized light separating plate 11, opposite to the arrangement of the first embodiment as described; and a reflective type spatial light modulating elements for blue light 14 disposed on the side of the primary wavelength plate 18 having the secondary wire grid polarized light separating plate 9, opposite to the arrangement of the first embodiment.

In this first modification, a phase plate for blue light 23, that rotates the plane of polarization of s-polarized blue light 90°, converting that light into p-polarized light is disposed between the primary wire grid polarized light separating plate 8 and secondary wire grid polarized light separating plate 9, while a phase plate for green light 24, that rotates the plane of polarization of s-polarized green light 90°, converting that light into p-polarized light is disposed between the tertiary wire grid polarized light separating plate 11 and a polarized light beam splitter prism 16, apart from these configurative aspects, the first modification is the same as the first embodiment as described.

The effects of this first modification are the same as those of the first embodiment of this invention.

Second Modification of the First Embodiment

A second modification of the first embodiment according to the present invention will now be described with reference to FIG. 9. The same symbols apply with respect to the parts of this second modification that are the same as those of the first embodiment and first modification of the first embodiment as described, therefore an explanation of each of those parts is omitted here.

As shown in FIG. 9, a projection display apparatus 25 according to a second modification of the first embodiment of the present invention comprises a system of the projection display apparatus 22 of the first modification of this embodiment as described, having arranged above a secondary wire grid polarized light separating plate 9 in order therefrom, a cylindrical lens 26, a primary wavelength plate 18 and a reflective type spatial light modulating elements for blue light 14, as well as a phase plate for blue light 27 disposed between the secondary wire grid polarized light separating plate 9 and the polarized light beam splitter prism 16.

In actual operations, when a user wishes to move the projection lens 6 up or down and use the projection display apparatus 25, unlike in the cases of the projection display apparatus 1 shown in FIG. 2 or the projection display apparatus 22 shown in FIG. 8 in which, as the projection lens 6 is disposed adjacent to the reflective type spatial light modulating elements for green light 12 or the reflective type spatial light modulating elements for blue light 14, the projection lens 6 comes up against those light modulating elements for green light 12 or 14, whereas the reflective type spatial light modulating elements for blue light 14 of the projection display apparatus 25 being disposed above, as shown in FIG. 9, the projection lens 6 does not come up against the reflective type spatial light modulating elements 12 or 14, thus enabling a wider degree of freedom in this projection display apparatus 25 in addition to the effects achieved by the apparatuses as described with respect to the first embodiment and the first modification thereof.

Third Modification of the First Embodiment

A third modification of the first embodiment according to the present invention will now be described with reference to FIG. 10.

As shown in FIG. 10, a projection display apparatus 28 according to a third modification of the first embodiment of the present invention comprises a system of the projection display apparatus 25 of the second modification of this embodiment as described, but having a cylindrical lens 29 disposed between a secondary wavelength plate 19 and a tertiary wire grid polarized light separating plate 11 and, instead of the polarized light beam splitter prism 16, a fourth wire grid polarized light separating plate 30, disposed at an angle of 45° with respect to the optical axis of s-polarized green light passing a phase plate for blue light 27. In all other respects, the fourth modification is the same as the third modification.

Because in this third modification all the wire grid separating plates 8, 9, 11 and 30 are used, to a greater extent than the effects realized by the second modification, this third modification enables a lightweight projection display apparatus to be realized, projecting images without double refraction.

The wire grid polarized light separating plates 8, 9, 11 and 30 are glass plates of a thickness of 1 mm. The cylindrical lenses 21, 26 and 29 are BK7 material of a thickness of 2 mm, having a radius of 75 mm. A greater degree of resolution can be achieved by making the surfaces of these cylindrical lenses 21, 26 and 29 toroidal aspheric surfaces. The polarized light beam splitter prism 16 may be of SF1, SF2, N-SF1 or N-SF2 material or the like, any of which can be by Schott Co., Ltd. Further, using material having a low photo elasticity factor (e.g. PBH56 by Ohara Co., Ltd., that suppresses occurrence of double refraction, enables images unaffected by nonuniformity to be obtained when the cylindrical lenses 21, 26 and 29 and the polarized light beam splitter prism 16 are used under strong light intensity.

Contrast can be further improved in the projection display apparatus of this third modification by disposing a primary post polarizer (polarizing panel) between the secondary phase plate for red light 15 or the phase plate for green light 24 and the polarized light beam splitter prism 16, thereby eliminating unnecessary light other than p-polarized light, or by disposing a secondary post polarizer (polarizing panel) between the secondary wire grid polarized light separating plate 9 and the polarized light beam splitter prism 16, thereby eliminating unnecessary light other than s-polarized light.

Contrast can be further improved in the projection display apparatus of this third modification by disposing a primary post polarizer the same as the above mentioned post polarizer between the phase plate for green light 24 and the fourth wire grid polarized light separating plate 30, thereby eliminating unnecessary light other than p-polarized light, or by disposing a secondary post polarizer the same as the above mentioned post polarizer, between the phase plate for blue light 27 and the fourth wire grid polarized light separating plate 30, thereby eliminating unnecessary light other than s-polarized light.

Moreover, wire grid polarized light separating plates can be used instead of the above described primary and secondary post polarizers. In this arrangement unwanted reflected light reaches the screen causing deterioration in image quality, therefore a reflection inhibiting coating must be applied to the surface of the wire grid polarized light separating plate. Further, when this configuration is used, unnecessary light may be eliminated by disposing the wire grid polarized light separating plate at an inclination in relation to the optical axis of incident light.

Fourth Modification of the First Embodiment

In the third modification of the first embodiment a single reflective type spatial light modulating elements is disposed on that side of the system in which the secondary wire grid polarized light separating plate 9 is disposed, while two reflective type spatial light modulating elements are disposed on that side of the system in which the tertiary wire grid polarized light separating plate 11 is disposed, however, in the fourth modification of this first embodiment shown in FIG. 11 in which the opposite is the case, the same effects are achieved.

In FIG. 11, a polarizing panel 31 passes s-polarized light as same as the primary polarizing panel 3. Further, it is sufficient if only the secondary wire grid polarized light separating plate 9 and the tertiary wire grid polarized light separating plate 11 are polarized light separating plates and the other polarized light separating means may be means such as a polarized light beam splitter or the like.

Embodiment 2

FIG. 12 depicts a projection display apparatus according to a second embodiment of the present invention. FIG. 13 shows a first modification of a projection display apparatus according to the second embodiment of the present invention. FIG. 14 shows a second modification of a projection display apparatus according to the second embodiment of the present invention and FIG. 15 shows a third modification of a projection display apparatus according to the second embodiment of the present invention.

As shown in FIG. 12 a projection display apparatus 101 related to a second embodiment of the present invention comprises, vertically, a lens 102 for concentrating light formed by a polarized light conversion plate or the like into nearly s-polarized light from light of indeterminate polarity, a polarizing panel 103 selected for a permeation axis for passing linearly polarized light having a relationship only to s-polarized light emitted from this lens 102, a color separation and synthesis optical system 104, for breaking down linearly polarized light emitted from this primary polarizing panel 103 into the three primary colors and, after modulating these separated three primary colors in relation to the respective image signal for each color light, performing color synthesis and forming a color image, and a projection lens 105 for expansively projecting color images synthesized at the color separation and synthesis optical system 104.

The color separation and synthesis optical system 104 comprises a dichroic mirror 106 disposed at an angle of 45° in relation to the optical axis of blue light, that passes light other than blue light and reflects blue light from among s-polarized light of the three primary colors passing the polarizing panel 103, a primary wire grid polarized light separating plate 107, disposed at an angle of 135° in relation to the optical axis of blue light, that reflects blue light reflected at the dichroic mirror 106, reflective spatial type light modulating elements for blue light 108 that modulate blue light reflected at the primary wire grid polarized light separating plate 107 in coordination with an image signal making that blue light into p-polarized light and a primary phase plate for blue light 109 that rotates 90° the plane of polarization of p-polarized blue light reflected and emitted from the reflective spatial type light modulating elements for blue light 108 and passing the primary wire grid polarized light separating plate 107, making that blue light into s-polarized light.

Further, the color separation and synthesis optical system 104 comprises, a primary phase plate for red light 110 that rotates 90° the plane of polarization of red light among those other lights passing the dichroic mirror 106, making that red light into p-polarized light, a secondary wire grid polarized light separating plate 111 disposed at an angle of 135° in relation to the optical axis of red light, that reflects s-polarized green light and passes p-polarized red light from among red light and other light (green light) passing the primary phase plate for red light 110, reflective type spatial light modulating elements for red light 112 disposed on the side of the secondary wire grid polarized light separating plate 111 of passed red light, that modulate the light of p-polarized red light in coordination with an image signal making that red light into s-polarized light and reflecting that red light, reflective type spatial light modulating elements for green light 113 disposed on the side of the secondary wire grid polarized light separating plate 111 at which green light is reflected that modulate s-polarized green light in coordination with an image signal making that green light into p-polarized light and reflecting that green light and a secondary phase plate for red light 114 that passes p-polarized green light reflected from the reflective type spatial light modulating elements for green light 113 and passing the secondary wire grid polarized light separating plate 111, and rotates 90° the plane of polarization of s-polarized red light reflected and emitted from the reflective type spatial light modulating elements for red light 112 and reflected at the secondary wire grid polarized light separating plate 111, making that red light into p-polarized light.

Moreover, the color separation and synthesis optical system 104 comprises a polarized light beam splitter prism 115 having a polarized light separating surface 115a that while reflecting blue light made into s-polarized light at the primary phase plate for blue light 109, passes p-polarized green light and red light emitted from the secondary phase plate for red light 114 and a secondary phase plate for blue light 116 that passes, p-polarized red light and green light emitted from the polarized light beam splitter prism 115 and rotates 90° the plane of polarization of s-polarized blue light making that blue light into p-polarized light.

A primary wavelength plate 117 is disposed between the primary wire grid polarized light separating plate 107 and the reflective spatial type light modulating elements for blue light 108 and a secondary wavelength plate 118 is disposed between the secondary wire grid polarized light separating plate 111 and the reflective type spatial light modulating elements for red light 112.

Further, a cylindrical lens 120, for correcting astigmatism arising when green light from the reflective type spatial light modulating elements for green light 113 reflected successively at a tertiary wavelength plate 119 and the reflective type spatial light modulating elements for green light 113 passes the secondary wire grid polarized light separating plate 111, is disposed between the secondary wire grid polarized light separating plate 111 and the reflective type spatial light modulating elements for green light 113. The convex surface of the cylindrical lens 120 faces towards the secondary wire grid polarized light separating plate 111.

The primary wavelength plate 117 is for correcting the condition of polarization of liquid crystal pretilt angle of blue light reflected at the reflective spatial type light modulating elements for blue light 108. The secondary wavelength plate 118 is for correcting the condition of polarization of liquid crystal pretilt angle of the reflective type spatial light modulating elements for red light 112. The tertiary wavelength plate 119 is for correcting the condition of polarization of liquid crystal pretilt angle of green light reflected at the reflective type spatial light modulating elements for green light 113.

Each of the wavelength plates uses either ¼ or ½ wavelength plate coordinated to the respective colors. It is sufficient for correction of liquid crystal pretilt angle to be of a very small degree, and a wavelength plate for very fine quantity below $1/10$ wavelength or further, below $1/20$ wavelength is preferable. When actually installing the wavelength plates the setting for the direction of the optical axis is performed by displaying a uniform black image on the reflective type spatial light modulating elements and adjusting until the image projected on screen is in the darkest condition possible.

Here, a description of the astigmatism correcting cylindrical lens 120, characteristic of the second embodiment of this invention, showing the effect of disposing the secondary wire grid polarized light separating plate 111 on the side of the reflective type spatial light modulating elements for green light 113 of reflected green light is omitted, as the same applies with respect thereto as is described using FIGS. 4 to 7 with respect to the cylindrical lens 21 for correcting astigmatism of the first embodiment.

In this second embodiment of the present invention, in the same manner as the first embodiment, a cylindrical lens, here, cylindrical lens 120, is disposed between the polarized light separating plate, here the secondary wire grid polarized light separating plate 111 and the reflective type spatial light modulating elements, here the reflective type spatial light modulating elements for green light 113, enabling astigmatism arising at the secondary wire grid polarized light separating plate 111 to be slightly corrected, thereby enabling high resolution images to be obtained.

The operation of this second embodiment will now be described with reference to the drawings.

In the projection display apparatus 101 related to the second embodiment of this invention shown in FIG. 12, light of the three primary colors, already formed into s-polarized light from light of indeterminate polarity by a polarizing panel or the like, is input to the lens 102. The light of the three primary colors focused at this lens 102 is then input to the polarizing panel 103. At the polarizing panel 103 only linearly polarized light that is s-polarized light is passed from this light of three primary colors, and this passed light is then input to the dichroic mirror 106. The dichroic mirror 106 reflects blue light and passes other lights.

S-polarized blue light reflected at the dichroic mirror 106 is reflected at the primary wire grid polarized light separating plate 107, passes the primary wavelength plate 117 in that condition and undergoes light modulation coordinated to an image signal for blue at the reflective spatial type light modulating elements for blue light 108 before being reflected.

After undergoing correction of the condition of polarization of liquid crystal pretilt angle at the primary wavelength plate 117, the generated p-polarized modulated blue light passes the primary wire grid polarized light separating plate 107, entering the primary phase plate for blue light 109, which functions to rotate the plane of polarization of this blue light 90° as described, so that p-polarized blue light is converted into s-polarized light and emitted. S-polarized blue light emitted from the primary phase plate for blue light 109 enters the polarized light beam splitter prism 115 by a transmissive surface 115b thereof, wherein this light is reflected at a polarized light separation surface 115a of that prism, entering the secondary phase plate for blue light 116, which functions to rotate the plane of polarization of this blue light 90° as described, so that s-polarized blue light is converted into p-polarized light and emitted.

The operation of this embodiment will now be described with respect to red light.

In the projection display apparatus 101 shown in FIG. 12, s-polarized red light passing the dichroic mirror 106 enters the primary phase plate for red light 110.

The primary phase plate for red light 110 functions to rotate the plane of polarization of red light 90°, so the red light is polarized from s-polarized light to p-polarized light and emitted, entering the secondary wire grid polarized light separating plate 111. This p-polarized red light passes the secondary wire grid polarized light separating plate 111 entering the reflective type spatial light modulating elements for red light 112 via the secondary wavelength plate 118. At the reflective type spatial light modulating elements for red light 112 this red light undergoes light modulation coordinated to an image signal for red and is reflected.

After undergoing correction of the condition of polarization of liquid crystal pretilt angle at the secondary wavelength plate 118, the s-polarized modulated red light thus generated is reflected at the secondary wire grid polarized light separating plate 111, entering the secondary phase plate for red light 114 wherein the s-polarized red light is converted into p-polarized light and then input to the polarized light beam splitter prism 115. This light then passes directly through the polarized light separating surface 115a of the polarized light beam splitter prism 115 so as to enter the secondary phase plate for blue light 116. The secondary phase plate for blue light 116 does not affect this red light, which is emitted therefrom as p-polarized light.

The operation of this embodiment will now be described with respect to green light.

In the projection display apparatus 101 shown in FIG. 12, s-polarized green light passing the dichroic mirror 106 enters the primary phase plate for red light 110. As described, the primary phase plate for red light 110 only operates on red light and therefore does not affect this green light which is emitted as s-polarized light having undergone no light polarization conversion, entering the secondary wire grid polarized light separating plate 111.

S-polarized green light is reflected at the secondary wire grid polarized light separating plate 111, entering the reflective type spatial light modulating elements for green light 113 via the cylindrical lens 120 and the tertiary wavelength plate 119. At the reflective type spatial light modulating elements for green light 113 this green light undergoes light modulation coordinated to an image signal for green and is reflected.

After undergoing correction of the light polarization condition of the liquid crystal pretilt angle at the tertiary wavelength plate 119, the p-polarized green light thus modulated is directed into the cylindrical lens 120, which corrects the astigmatism of the tangential and sagittal elements of this p-polarized green light and directs that light into the secondary wire grid polarized light separating plate 111. The p-polarized green light then passes directly through the secondary wire grid polarized light separating plate 111 entering the secondary phase plate for red light 114. As described, the secondary phase plate for red light 114 does not operate with respect to green light therefore this green light is emitted from the secondary phase plate for red light 114 as p-polarized light, entering the polarized light beam splitter prism 115. The green light then passes directly through the polarized light separating surface 115a of the polarized light beam splitter prism 115 and is emitted from the transmittance face 115c, entering the secondary phase plate for blue light 116 disposed at the subsequent stage.

As described, the secondary phase plate for blue light 116 does not act on green light therefore this green light is emitted from the secondary phase plate for blue light 116 as p-polarized light.

In this way, red light, green light and blue light the respective planes of polarization of which are p-polarized are projected in color, expansively displayed, via the projection lens 105, on a screen not shown in the drawing.

As described, as the second embodiment of the present invention provides a cylindrical lens 120 disposed between the secondary wire grid polarized light separating plate 111 and the reflective type spatial light modulating elements for green light 113, astigmatism arising at the secondary wire grid polarized light separating plate 111 can be slightly corrected thereby enabling high resolution images to be obtained.

Further, as the wavelength dependence of the rate of permeability of light of P polarization is small and the planar shaped wire grid polarized light separating plates 107 and 111 are used, the projection display apparatus of this embodiment is lightweight and enables satisfactory high-quality images to be obtained because double refraction due to thermal distribution does not arise.

Moreover, a phase plate is not required for making at least one of the three primary colors into p-polarized light in order to separate light of the three primary colors made into s-polarized light at the polarizing panel 103 because the dichroic mirror 106 is used, thereby enabling the projection display apparatus 101 to be realized having a small number of parts making the apparatus light weight.

When the projection lens 105 is moved up and down as the projection display apparatus 101 is used, the projection lens 105 does not come up against the reflective spatial type light modulating elements for blue light 108 because the modulating elements 108 is disposed above, thus enabling a wider degree of freedom in this projection display apparatus 101. The same effect is achieved where the reflective type spatial light modulating elements for red light 112 or reflective type spatial light modulating elements for green light 113 is disposed instead of the reflective spatial type light modulating elements for blue light 108.

This embodiment was described with respect to conversion of light of the three primary colors from light of indeterminate polarity into s-polarized light by a polarizing panel or the like, however this embodiment also operates in the same manner with respect to converting light of indeterminate polarity into p-polarized light.

A description of the secondary phase plate for blue light 116 is here omitted as, for red, green and blue light emitted from the projection display apparatus 101 the contrast ratio of blue light from s-polarized light is obtained in the same manner as the contrast ratios of red light and green light of p-polarized light.

First Modification of the Second Embodiment

A first modification of the second embodiment according to the present invention will now be described with reference to FIG. 13. The same symbols apply with respect to the parts of this first modification of the second embodiment that are the same as those of the second embodiment as described, therefore an explanation of each of those parts is omitted here.

As shown in FIG. 13, a projection display apparatus 121 according to a first modification of the second embodiment of the present invention comprises a system of the projection display apparatus 101 of the second embodiment as described having, instead of the polarized light beam splitter prism 115, a dichroic prism 122 that reflects s-polarized blue light and passes p-polarized red light and green light; apart from that feature, the projection display apparatus 121 is in all other respects the same as the projection display apparatus 101 and obtains the same effects.

Second Modification of the Second Embodiment

A second modification of the second embodiment according to the present invention will now be described with reference to FIG. 14. The same symbols apply with respect to the parts of this second modification of the first embodiment that are the same as those of the second embodiment and the first modification thereof as described, therefore an explanation of each of those parts is omitted here.

As shown in FIG. 14, a projection display apparatus 123 according to a second modification of the second embodiment of the present invention comprises a system of the projection display apparatus 121 of the first modification of the second embodiment shown in FIG. 13 having, instead of the dichroic mirror 106, a wire grid polarized light separating plate 124, instead of the dichroic prism 122, a dichroic mirror 127; having a cylindrical lens 125 disposed between the primary wire grid polarized light separating plate 107 and the primary wavelength plate 117, for correcting astigmatism arising when blue light reflected at the reflective spatial type light modulating elements for blue light 108 passes the primary wire grid polarized light separating plate 107; and a cylindrical lens 126 disposed between the secondary wire grid polarized light separating plate 111 and the secondary wavelength plate 118 for correcting astigmatism arising when green light reflected at the reflective type spatial light modulating elements for red light 112 passes the secondary wire grid polarized light separating plate 111; the projection display apparatus 123 is in all other respects the same as the projection display apparatus 121 and obtains the same effects as the projection display apparatus 121.

Third Modification of the Second Embodiment

A third modification of the second embodiment according to the present invention will now be described with reference to FIG. 15. The same symbols apply with respect to the parts of this third modification that are the same as those of the second embodiment and the first and second modifications thereof as described, therefore an explanation of each of those parts is omitted here.

As shown in FIG. 15, a projection display apparatus 128 according to a third modification of the second embodiment of the present invention comprises vertically, a lens 102 for concentrating light formed by a polarized light conversion plate or the like into p-polarized light from light of indeterminate polarity, a primary polarizing panel 129 selected for a permeation axis for passing linearly polarized light that is only p-polarized light emitted from this lens 102, a color separation and synthesis optical system 104, for breaking down linearly polarized light emitted from this primary polarizing panel 129 into the three primary colors and, after modulating these separated three primary colors in relation to the respective image signal for each color light, performing color synthesis and forming a color image, and a projection lens 105 for expansively projecting color images synthesized at the a color separation and synthesis optical system 104.

The color separation and synthesis optical system 104 comprises a dichroic mirror 130 disposed at an angle of 45° in relation to the optical axis of red light, that passes red light and reflects other light (blue light and green light) from among p-polarized light of the three primary colors passing the primary polarizing panel 129, a primary phase plate for blue light 131 that rotates 90° the plane of polarization of blue light among those other lights (blue light and green light) reflected at the dichroic mirror 130, making that blue light into s-polarized light, and a primary wire grid polarized light separating plate 132, disposed at an angle of 135° in relation to the optical axis of other light, that reflects s-polarized blue light emitted from the primary phase plate for blue light 131, passes p-polarized green light.

Moreover, the color separation and synthesis optical system 104 comprises, reflective type spatial light modulating elements for blue light 108 disposed on the side of the primary wire grid polarized light separating plate 132 at which blue light is reflected, that modulate s-polarized blue light in coordination with an image signal making that blue light into p-polarized light, reflective type spatial light modulating elements for green light 113, disposed on the side of the primary wire grid polarized light separating plate 132 of passed green light, that modulate p-polarized green light in coordination with an image signal making that green light into s-polarized light and reflecting that green light, a secondary phase plate for blue light 133 that passes s-polarized green light reflected and emitted at the reflective type spatial light modulating elements for green light 113 and reflected at the primary wire grid polarized light separating plate 132 and rotates 90° the plane of polarization of p-polarized blue light reflected and emitted at the reflective spatial type light modulating elements for blue light 108 and passing the primary wire grid polarized light separating plate 132, making that blue light into s-polarized light and a secondary polarizing panel 134 selected for a permeation axis for passing linearly polarized light that is only s-polarized light, emitted from the 133.

Moreover, the color separation and synthesis optical system 104 comprises, a secondary wire grid polarized light separating plate 135 disposed at an angle of 135° in relation to the optical axis of red light, that passes p-polarized red light passing the dichroic mirror 130, reflective type spatial light modulating elements for red light 112, disposed on the side of the secondary wire grid polarized light separating plate 135 of passed red light, that modulate p-polarized red light coordinated to an image signal, making that red light s-polarized light and reflecting that red light, and a primary phase plate for red light 136 that rotates 90° s-polarized red light reflected and emitted from the reflective type spatial light modulating elements for red light 112 and reflected at the secondary wire grid polarized light separating plate 135, making that red light p-polarized light.

Moreover, the color separation and synthesis optical system 104 comprises, a polarized light beam splitter prism 115 having a polarized light separating surface 115*a* that while reflecting s-polarized green light and blue light emitted from the secondary polarizing panel 134, passes red light made p-polarized light at the primary phase plate for red light 136, and a secondary phase plate for red light 137 that passes, s-polarized green light and blue light emitted from the polarized light beam splitter prism 115 and rotates 90° the plane of polarization of p-polarized red light making that red light s-polarized light.

A primary wavelength plate 138 is disposed between the primary wire grid polarized light separating plate 132 and the reflective type spatial light modulating elements for green light 113 and a secondary wavelength plate 139 is disposed between the secondary wire grid polarized light separating plate 135 and the reflective type spatial light modulating elements for red light 112.

Further, a cylindrical lens 141, for correcting astigmatism arising when blue light from the reflective spatial type light modulating elements for blue light 108 reflected successively at the 140 and the reflective spatial type light modulating elements for blue light 108, passes the primary wire grid polarized light separating plate 132, is disposed between the primary wire grid polarized light separating plate 132 and the reflective spatial type light modulating elements for blue light 108.

The primary, secondary and tertiary wavelength plates 138, 139 and 140 have the same properties as the primary, secondary and tertiary wavelength plates 117, 118 and 118 described with reference to the second embodiment of the present invention.

A description of the phase plate for red light 137 is here omitted as, for red, green and blue light emitted from the projection display apparatus 128 the contrast ratio of red light from s-polarized light is obtained in the same manner as the contrast ratios of green light and blue light of p-polarized light.

A dichroic prism or a dichroic mirror that reflects s-polarized blue light and passes p-polarized red light and green light may be disposed instead of the polarized light beam splitter prism 115. In this case, the same effects are achieved as those achieved by the second embodiment of this invention.

The wire grid polarized light separating plates 107, 111, 132 and 135 are glass plates of a thickness of 1 mm. The cylindrical lenses 120, 125, 126 and 141 are BK7 material of a thickness of 2 mm, having a radius of 75 mm. A greater degree of resolution can be achieved by making the surfaces of these cylindrical lenses toroidal aspheric surfaces. The polarized light beam splitter prism 115 may be of SF1, SF2, N-SF1 or N-SF2 material or the like, any of which can be by Schott Co. Ltd. Further using material having a low photo elasticity factor (e.g. PBH56 by Ohara Co., Ltd., that suppresses occurrence of double refraction, enables images unaffected by nonuniformity to be obtained when the cylindrical lenses 120, 125,126 and 141 and the polarized light beam splitter prism 115 are used under strong light intensity.

Other Modifications of the Second Embodiment

In the projection display apparatus 101 according to the second embodiment as shown in FIG. 12 or in the projection display apparatus 121 according to the first modification of the second embodiment as shown in FIG. 13, a primary post polarizer (polarizing panel) may be disposed between the primary phase plate for blue light 109 and the polarized light beam splitter prism 115 or dichroic prism 122, eliminating unnecessary light other than s-polarized light and providing improved contrast, or a secondary post polarizer (polarizing panel) may be disposed between the secondary phase plate for red light 114 and the polarized light beam splitter prism 115 or the dichroic prism 122, thereby eliminating unnecessary light other than p-polarized light and providing improved contrast.

In the projection display apparatus 123 according to the second modification of the second embodiment as shown in FIG. 14, a primary post polarizer may be disposed between the primary wire grid polarized light separating plate 107 and the dichroic mirror 127 eliminating unnecessary light other than p-polarized light and providing improved contrast, or a secondary post polarizer (polarizing panel) may be disposed between the secondary phase plate for red light 114 and the dichroic mirror 127 thereby eliminating unnecessary light other than s-polarized light and providing improved contrast.

In the projection display apparatus 128 according to the third modification of the second embodiment as shown in FIG. 15, a post polarizer may be disposed between the primary phase plate for red light 136 and the polarized light beam splitter prism 115 eliminating unnecessary light other than p-polarized light and providing improved contrast.

Moreover, wire grid polarized light separating plates can be used instead of the above described primary and secondary post polarizers. In this arrangement unwanted reflected light reaches the screen causing deterioration in image quality, therefore a reflection inhibiting coating must be applied to the surface of the wire grid polarized light separating plate. Further, when this configuration is used, unnecessary light may be eliminated by disposing the wire grid polarized light separating plate at an inclination in relation to the optical axis of incident light.

Embodiment 3

FIG. 16 depicts a projection display apparatus according to a third embodiment of the present invention. FIG. 17 shows a first modification of a projection display apparatus according to the third embodiment of the present invention. FIG. 18 shows a second modification of a projection display apparatus according to the third embodiment of the present invention.

As shown in FIG. 16 a projection display apparatus 201 related to a third embodiment of the present invention comprises, vertically, a lens 202 for concentrating light formed by a polarized light conversion plate or the like into p-polarized light from light of indeterminate polarity, a primary polarizing panel 203 selected for a permeation axis for passing linearly polarized light that is only p-polarized light emitted from this lens 202, a color separation and synthesis optical system 204, for breaking down linearly polarized light emitted from this primary polarizing panel 203 into the three primary colors and, after modulating these separated three primary colors in relation to the respective image signal for each color light, performing color synthesis and forming a color image, and a projection lens 205 for expansively projecting color images synthesized at the color separation and synthesis optical system 204.

The color separation and synthesis optical system 204 comprises a dichroic mirror 206 disposed at an angle of 45° in relation to the optical axis of blue light, that passes light other than green light and reflects green light from among p-polarized light of the three primary colors passing the primary polarizing panel 203, a secondary polarizing panel 207, that passes only p-polarized light of green light reflected at the dichroic mirror 206, a primary wire grid polarized light separating plate 208, disposed at an angle of 135° in relation to the optical axis of green light, that passes p-polarized green light, reflective spatial type light modulating elements for green light 209 that modulate p-polarized green light passing the primary wire grid polarized light separating plate 208 in coordination with an image signal making that green light into s-polarized light and a tertiary polarizing panel 210 that passes only s-polarized green light reflected and emitted at the reflective spatial type light modulating elements for green light 209 and reflected at the primary wire grid polarized light separating plate 208.

Further, the color separation and synthesis optical system 204 comprises, a fourth polarizing panel 211 that passes only the other p-polarized lights passing the dichroic mirror 206, a phase plate for blue light 212 that rotates 900 the plane of polarization of blue light among the other lights of P polarization emitted from the fourth polarizing panel 211, making that blue light into s-polarized light, a secondary wire grid polarized light separating plate 213, that reflects s-polarized blue light emitted from the phase plate for blue light 212 and passes p-polarized red light, reflective type spatial light modulating elements for blue light 214, that modulate blue light reflected at the secondary wire grid polarized light separating plate 213 in coordination with an image signal making that blue light into p-polarized light and reflecting that blue light, reflective type spatial light modulating elements for red light 215 that modulate red light passing the secondary wire grid polarized light separating plate 213 in coordination with an image signal making that red light into s-polarized light and reflecting that red light and a phase plate for red light 216 that passes p-polarized blue light reflected and emitted from the reflective type spatial light modulating elements for blue light 214 and passing the secondary wire grid polarized light separating plate 213 and rotates 90° the plane of polarization of s-polarized red light reflected and emitted from the reflective type spatial light modulating elements for red light 215, making that red light into p-polarized light.

Moreover, the color separation and synthesis optical system 204 comprises a fifth polarizing panel 217 that passes only p-polarized light of red light and blue light emitted from the phase plate for red light 216, a dichroic prism 218 having a dichroic mirror surface 218a that while reflecting s-polarized green light emitted from the tertiary polarizing panel 210, passes p-polarized red light and blue light passing the fifth polarizing panel 217, and a phase plate for green light 219 that passes, p-polarized red light and blue light emitted from the dichroic prism 218 and rotates 90° the plane of polarization of s-polarized green making that green light into p-polarized light.

A primary wavelength plate 220 is disposed between the primary wire grid polarized light separating plate 208 and the reflective spatial type light modulating elements for green light 209 and a secondary wavelength plate 221 is disposed between the secondary wire grid polarized light separating plate 213 and the reflective type spatial light modulating elements for red light 215.

Further, a cylindrical lens 223, for correcting astigmatism arising when blue light from the reflective type spatial light modulating elements for blue light 214 reflected successively at a tertiary wavelength plate 222 and the reflective type spatial light modulating elements for blue light 214, passes the secondary wire grid polarized light separating plate 213, is disposed between the secondary wire grid polarized light separating plate 213 and the reflective type spatial light modulating elements for blue light 214. The cylindrical lens 223 is disposed having the convex surface thereof facing the secondary wire grid polarized light separating plate 213.

The primary wavelength plate 220 is for correcting the condition of polarization of liquid crystal pretilt angle of green light reflected at the reflective spatial type light modulating elements for green light 209. The secondary wavelength plate 221 is for correcting the condition of polarization of liquid crystal pretilt angle of red light reflected at the reflective type spatial light modulating elements for red light 215. The tertiary wavelength plate 222 is for correcting the condition of polarization of liquid crystal pretilt angle of blue light reflected at the reflective type spatial light modulating elements for blue light 214.

Each of the wavelength plates uses either ¼ or ½ wavelength plate coordinated to the respective colors. It is sufficient for correction of liquid crystal pretilt angle to be of a very small degree, and a wavelength plate for very fine quantity below ¹⁄₁₀ wavelength or further, below ¹⁄₂₀ wavelength is preferable. When actually installing the wavelength plates the setting for the direction of the optical axis is performed by displaying a uniform black image on the reflective type spatial light modulating elements and adjusting until the image projected on screen is in the darkest condition possible.

Here, a description of the astigmatism correcting cylindrical lens 223, characteristic of the third embodiment of this invention, showing the effect of disposing the astigmatism correcting cylindrical lens 223 on the side of the reflective type spatial light modulating elements for green light 214 of reflected blue light facing to the secondary wire grid polarized light separating plate 213 is omitted, as the same applies with respect thereto as is described using FIGS. 4 to 7 with respect to the cylindrical lens 21 for correcting astigmatism of the first embodiment.

In this third embodiment of the present invention, in the same manner as the first embodiment, a cylindrical lens, here, cylindrical lens 223, is disposed between the polarized light separating plate, here the secondary wire grid polarized light separating plate 213 and the reflective type spatial light modulating elements, here the reflective type spatial light modulating elements for blue light 214, enabling astigmatism arising at the secondary wire grid polarized light separating plate 213 to be slightly corrected, thereby enabling high resolution images to be obtained.

The operation of this third embodiment will now be described with reference to the drawings.

In the projection display apparatus 201 related to the third embodiment of this invention shown in FIG. 16, light of the three primary colors, already formed into p-polarized light from light of indeterminate polarity by a polarizing panel or the like, is input to the lens 202. The light of the three primary colors focused at this lens 202 is then input to the primary polarizing panel 203. At the primary polarizing panel 203 linearly polarized light that is only p-polarized light from this light of three primary colors is passed, and this passed light is then input to the dichroic mirror 206. The dichroic mirror 206 reflects green light and passes other lights.

P-polarized green light reflected at the dichroic mirror 206 passes in that condition and is emitted from the secondary polarizing panel 207 that passes only p-polarized light of green light. The green light thus emitted passes the primary wire grid polarized light separating plate 208, and passing via the primary wavelength plate 220, undergoes light modulation coordinated to an image signal for green at the reflective spatial type light modulating elements for green light 209 before being reflected.

After undergoing correction of the condition of polarization of liquid crystal pretilt angle at the primary wavelength plate 220, the generated s-polarized modulated green light is reflected at the primary wire grid polarized light separating plate 208 entering the tertiary polarizing panel 210. Green light made into S polarization only, at the tertiary polarizing panel 210, is reflected at a dichroic mirror surface 218a of the dichroic prism 218 and is then emitted from a transmittance surface 218c of the dichroic prism 218, entering the phase plate for green light 219. The phase plate for green light 219 rotates 90° the plane of polarization of this s-polarized green light, converting that green light into p-polarized green light which is then emitted.

The operation of this embodiment will now be described with respect to red light.

In the projection display apparatus 201 shown in FIG. 16, p-polarized red light passing the dichroic mirror 206 enters the fourth polarizing panel 211.

After being converted into p-polarized light at the fourth polarizing panel 211, the red light enters the phase plate for blue light 212. The phase plate for blue light 212 does not act on red light therefore this red light is emitted therefrom in the p-polarized condition entering the secondary wire grid polarized light separating plate 213. This p-polarized red light passes the secondary wire grid polarized light separating plate 213 entering the reflective type spatial light modulating elements for red light 215 via the secondary wavelength plate 221. At the reflective type spatial light modulating elements for red light 215 this red light undergoes light modulation coordinated to an image signal for red and is reflected.

After undergoing correction of the condition of polarization of liquid crystal pretilt angle at the secondary wavelength plate 221, the s-polarized modulated red light thus generated is reflected at secondary wire grid polarized light separating plate 213, entering the phase plate for red light 216 wherein the s-polarized red light is converted into p-polarized light and, after being formed into p-polarized light only, at the fifth polarizing panel 217 this p-polarized red light enters the dichroic prism 218. This light then passes directly through the dichroic mirror surface 218a of the dichroic prism 218 so as to enter the phase plate for green light 219. The phase plate for green light 219 does not affect this red light, which is emitted from the phase plate for green light 219 as p-polarized light.

The operation of this embodiment will now be described with respect to blue light.

P-polarized blue light passing the dichroic mirror 206 enters the fourth polarizing panel 211. After being made into only p-polarized light at the fourth polarizing panel 211, this blue light enters the phase plate for blue light 212. The phase plate for blue light 212 rotates 90° the plane of polarization of p-polarized blue light making that blue light into s-polarized light and emits this s-polarized blue light injecting that light into the secondary wire grid polarized light separating plate 213.

S-polarized blue light is reflected at the secondary wire grid polarized light separating plate 213, entering the reflective type spatial light modulating elements for blue light 214 via the cylindrical lens 223 and the tertiary wavelength plate 222. At the reflective type spatial light modulating elements for blue light 214 this blue light undergoes light modulation coordinated to an image signal for blue and is reflected.

After undergoing correction of the light polarization condition of the liquid crystal pretilt angle at the cylindrical lens 223, the p-polarized blue light thus modulated is directed into the cylindrical lens 223, which corrects the astigmatism of the tangential and sagittal elements of this p-polarized blue light and directs that light into the secondary wire grid polarized light separating plate 213. The p-polarized blue light then passes directly through the secondary wire grid polarized light separating plate 213 entering the phase plate for red light 216. As described, the phase plate for red light 216 does not operate with respect to blue light therefore this blue light is emitted therefrom in the p-polarized condition entering the fifth polarizing panel 217. After being formed into only p-polarized light at the fifth polarizing panel 217 this p-polarized blue light enters the dichroic prism 218, wherein this light passes directly through the dichroic mirror surface 218a and is emitted from the 218c entering the phase plate for green light 219 disposed at the subsequent stage.

As described, the phase plate for green light 219 does not act on blue light therefore this blue light is emitted from the phase plate for green light 219 as p-polarized light.

In this way, red light, green light and blue light the respective planes of polarization of which are made into P polarization are projected in color, expansively displayed, via the projection lens 205, on a screen not shown in the drawing.

As described, as the third embodiment of the present invention provides a cylindrical lens 223 disposed between the secondary wire grid polarized light separating plate 213 and the reflective type spatial light modulating elements for blue light 214, astigmatism arising at the secondary wire grid polarized light separating plate 213 can be slightly corrected thereby enabling high resolution images to be obtained.

Further, as the wavelength dependence of the rate of permeability of light of P polarization is small and the planar shaped wire grid polarized light separating plates 208 and 213 are used, the projection display apparatus of this embodiment is lightweight and enables satisfactory high-quality images to be obtained because double refraction due to thermal distribution does not arise.

Moreover, a phase plate is not required for making at least one of the three primary colors into s-polarized light in order to separate light of the three primary colors made into p-polarized light at the primary polarizing panel 203 because the dichroic mirror 206 is used, thereby enabling the projection display apparatus 201 to be realized having a small number of parts making the apparatus light weight.

The same effects are obtained when a reflective type spatial light modulating elements for blue light 214 or a reflective type spatial light modulating elements for red light 215 is disposed instead of the reflective spatial type light modulating elements for green light 209.

This third embodiment was described with respect to conversion of light of the three primary colors from light of indeterminate polarity into p-polarized light by a polarizing panel or the like, however this embodiment also operates in the same manner with respect to converting light of indeterminate polarity into s-polarized light.

A description of the phase plate for green light 219 is here omitted as, for red, green and blue light emitted from the projection display apparatus 201 the contrast ratio of blue light from s-polarized light is obtained in the same manner as the contrast ratios of red light and green light of p-polarized light.

Where contrast is sufficiently maintained in light emitted from the projection display apparatus 201, the secondary, tertiary, fourth and fifth polarizing panels can be dispensed with.

First Modification of the Third Embodiment

A first modification of the third embodiment of the present invention will now be described with reference to FIG. 17. The same symbols apply with respect to the parts of this first modification that are the same as those of the third embodiment as described, therefore an explanation of each of those parts is omitted here.

As shown in FIG. 17, a projection display apparatus 224 according to a first modification of the third embodiment of the present invention comprises, vertically, a lens 202 for concentrating light formed by a polarized light conversion plate or the like into p-polarized light from light of indeterminate polarity, a primary polarizing panel 203 selected for a permeation axis for passing light of linearly polarized light that is only p-polarized light emitted from this lens 202, a color separation and synthesis optical system 204, for breaking down linearly polarized light emitted from this primary polarizing panel 203 into the three primary colors and, after modulating these separated three primary colors in relation to the respective image signal for each color light, performing color synthesis and forming a color image, and a projection lens 205 for expansively projecting color images synthesized at the color separation and synthesis optical system 204.

The color separation and synthesis optical system 204 comprises a dichroic mirror 225 disposed at an angle of 45° in relation to the optical axis of red light, that passes light other than red light and reflects red light from among p-polarized light of the three primary colors passing the primary polarizing panel 203, a secondary polarizing panel 207 for passing only p-polarized light of red light reflected at the dichroic mirror 225, a primary wire grid polarized light separating plate 208, disposed at an angle of 135° in relation to the optical axis of red light, that passes p-polarized red light, reflective spatial type light modulating elements for red light 215 that modulate p-polarized red light passing the primary wire grid polarized light separating plate 208 in coordination with an image signal making that red light into s-polarized light and a tertiary polarizing panel 210 for passing s-polarized light of red light reflected and emitted from the reflective type spatial light modulating elements for red light 215 and reflected at the primary wire grid polarized light separating plate 208.

Further, the color separation and synthesis optical system 204 comprises, a fourth polarizing panel 211 that passes only p-polarized light of those other lights passing the dichroic mirror 225, a phase plate for blue light 212 that rotates 90° the plane of polarization of blue light from among those other p-polarized lights emitted from the fourth polarizing panel 211, making that blue light s-polarized light, a secondary wire grid polarized light separating plate 213, that reflects s-polarized blue light emitted from the phase plate for blue light 212 and passes p-polarized green light, reflective type spatial light modulating elements for blue light 214 that modulate blue light reflected at the secondary wire grid polarized light separating plate 213 in coordination with an image signal making that blue light into p-polarized light and reflecting that blue light, reflective type spatial light modulating elements for green light 209 that modulate green light passing the secondary wire grid polarized light separating plate 213 in coordination with an image signal making that green light into s-polarized light and reflecting that green light and a phase plate for green light 226 that passes p-polarized blue light reflected and emitted from the reflective type spatial light modulating elements for blue light 214 and passing the secondary wire grid polarized light separating plate 213, and rotates 90° the plane of polarization of s-polarized green light reflected and emitted from the reflective spatial type light modulating elements for green light 209, making that green light p-polarized light.

Moreover, the color separation and synthesis optical system 104 comprises a fifth polarizing panel 217, that passes only p-polarized light of green and blue lights emitted from the phase plate for green light 226, a dichroic prism 227 having a dichroic mirror surface 227a that while passing s-polarized red light emitted from the tertiary polarizing panel 210, reflects p-polarized green and blue lights passing the fifth polarizing panel 217, and a phase plate for red light 228, that passes p-polarized green and blue lights emitted from the dichroic prism 227 and rotates 90° the plane of polarization of s-polarized red light, making that red light p-polarized light.

In all other respects the projection display apparatus 224 of this first modification of the third embodiment is same as the projection display apparatus 201 of the third embodiment and obtains the same effects.

Second Modification of the Third Embodiment

A second modification of the third embodiment according to the present invention will now be described with reference to FIG. 18. The same symbols apply with respect to the parts of this second modification of the third embodiment that are the same as those of the third embodiment and the first modification thereof as described, therefore an explanation of each of those parts is omitted here.

As shown in FIG. 18, a projection display apparatus 229 according to a second modification of the third embodiment of the present invention comprises a system of the projection display apparatus 224 of the first modification of the third embodiment shown in FIG. 17 having, instead of the dichroic mirror 225, a wire grid polarized light separating plate 230, and a phase plate for red light 231 disposed between the wire grid polarized light separating plate 230 and the primary polarizing panel 203, the projection display apparatus 229 is in all other respects the same as the projection display apparatus 224.

In the case of this apparatus 229, p-polarized light of the three primary colors passing the primary polarizing panel 203 is injected into the phase plate for red light 231 wherein the plane of polarization of red light from among p-polarized light of the three primary colors is rotated 90°, making that red light s-polarized light which light is then input into the wire grid polarized light separating plate 230 and, subsequently input into the reflective type spatial light modulating elements for red light 215 via the secondary wavelength plate 221. Here, light of indeterminate polarity polarized by a polarized light conversion plate or the like is p-polarized light.

This projection display apparatus 229 obtains the same effects as are obtained by the projection display apparatus of the third embodiment.

The wire grid polarized light separating plates 208 and 213 are glass plates of a thickness of 1 mm. The cylindrical lens 223 is BK7 material of a thickness of 2 mm, having a radius of 75 mm. A greater degree of resolution can be achieved by making the surface of this cylindrical lens 223 a toroidal aspheric surface.

Because p-polarized light elements are mixed in with s-polarized light, which is reflected at the wire grid polarized light separating plate, a high contrast ratio cannot be achieved if there is no post polarizer (polarizing panel). In the projection display apparatus 201 of the third embodiment shown in FIG. 16, the projection display apparatus 224 of the first modification of that embodiment, shown in FIG. 17 and the projection display apparatus of the second modification of that embodiment shown in FIG. 18, the primary post polarizer (polarizing panel 210) is disposed between primary wire grid polarized light separating plate 208 and the dichroic prisms 218 and 227, to remove unnecessary light other than s-polarized light thereby improving contrast, or the secondary post polarizer (polarizing panel 217) is disposed between the secondary wire grid polarized light separating plate 213 and the dichroic prisms 218 and 227 to remove unnecessary light other than p-polarized light, thereby improving contrast.

Further, as polarizing panels 210 and 217 acting as post polarizers, are disposed before the dichroic prisms 218 and 227 used for color synthesis, even if double refraction arises in light after that light is input to a dichroic prism, this has no effect at all on shading. Normal optical fiber glass, such as BK7 or the like can be used as the material for the prisms, which is inexpensive.

Wire grid polarized light separating plates can be used instead of the primary and secondary post polarizers.

In this case, unwanted reflected light reaches the screen causing a deterioration in the quality of the display, therefore a reflection inhibiting coating must be applied to the surface of the wire grid polarized light separating plates. Further, when this configuration is used, unnecessary light may be eliminated by disposing the wire grid polarized light separating plate at an inclination in relation to the optical axis of light incident thereto.

Moreover, in the apparatuses of the third embodiment of this invention and the first and second modifications thereof, a single reflective type spatial light modulating elements is disposed on that side of the apparatus having the primary wire grid polarized light separating plate 208 and two reflective type spatial light modulating elements are disposed on the side of the apparatus having the secondary wire grid polarized light separating plate 213, however the same effect would be achieved with the opposite arrangement.

Effects of the Invention (1) In the first, second and third embodiments of the present invention at least two among the primary, secondary, tertiary and fourth polarized light separating means are wire grid polarized light separating plates, and at least one from among the primary, secondary and tertiary reflective type spatial light modulating elements provides a lens for correcting astigmatism near the side thereof of the reflecting surface, thereby enabling a projection display apparatus to be realized that is lightweight and provides bright, high quality images.

(2) In the fourth, fifth and sixth embodiments of the present invention, the primary polarized light separating means among the primary, secondary, tertiary and fourth polarized light separating means, is a first dichroic separating means, the fourth polarized light separating means is a second dichroic separating means or polarized light beam splitter means and the other polarized light separating means are wire grid polarized light separating plates. At least one from among the primary, secondary and tertiary reflective type spatial light modulating elements also, provides a lens for correcting astigmatism near the side thereof of the reflecting surface, thereby enabling a projection display apparatus to be realized that is lightweight and provides bright, high quality images.

(3) In the seventh, eighth and ninth embodiments of the present invention, the second and third polarized light separating means among the primary, secondary, tertiary and fourth polarized light separating means, are wire grid polarized light separating plates, a primary polarizing panel being disposed on the side of the fourth polarized light separating means having the secondary polarized light separating means, a secondary polarizing panel being disposed on the side of the fourth polarized light separating means having the tertiary polarized light separating means, thereby enabling a projection display apparatus to be realized that is lightweight and provides bright, high quality images with a high contrast ratio.

Further, at least one from among the primary, secondary and tertiary reflective type spatial light modulating elements, provides a lens for correcting astigmatism near the side thereof of the reflecting surface, thereby enabling a projection display apparatus to be realized that is lightweight and provides bright, high quality images with a high contrast ratio.

Moreover, as a dichroic prism is used for a fourth polarized light separating means synthesizing color and a polarizing panel acting as a post polarizer is disposed before the dichroic prism, even if double refraction arises in light after that light is input to a dichroic prism, this has no effect at all on shading. Normal optical fiber glass, such as BK7 or the like can be used as the material for the prisms, which is inexpensive.

That which is claimed:

1. A projection display apparatus comprising:
a color separating and synthesis optical system comprising a first polarized light separating means, a second polarized light separating means, a third polarized light separating means and a fourth polarized light separating means wherein said first, second, third and fourth light separating means are disposed in respective diagonal directions therein, said first polarized light separating means is disposed on that side on which illuminating light is incident and said fourth polarized light separating means is disposed on that side at which projection is performed, a first reflective type spatial light modulating elements disposed on either the opposite side with respect to that side of said second polarized light separating means on which said first polarized light separating means is disposed or the opposite side with respect to that side on which said fourth polarized light separating means is disposed, a second reflective type spatial light modulating elements disposed on the opposite side with respect to that side of said third polarized light separating means on which said first polarized light separating means is disposed, and a third reflective type spatial light modulating elements disposed on the opposite side with respect to that side of said third polarized light separating means on which said fourth polarized light separating means is disposed, in which the color separating and synthesis optical system, after light including light of the three primary colors made in advance into light of determined polarization from light of indeterminate polarization is separated into the respective primary colors by said first, second and third polarized light separating means, and after each respective color undergoes modulation coordinated to an image signal for each respective color and is reflected by the respective said first, second and third reflective type spatial light modulating elements, color synthesis is performed and a color image is generated by said second, third and fourth polarized light separating means; and a projection lens for expansively projecting said color image generated by said color separating and synthesis optical system;

wherein said first, second and third polarized light separating means comprise a wire grid polarized light separating plate, respectively, and a lens for correcting astigmatism is disposed near the side of the reflective surface of at least a reflective type spatial light modulating element from among said first, second and third reflective type spatial light modulating elements, respectively.

2. A projection display apparatus according to claim 1 wherein said astigmatism correcting lens is a cylindrical lens.

3. A projection display apparatus according to claim 2 wherein the surface of said cylindrical lens is an aspheric, toroidal surface.

* * * * *